US006754703B1

(12) United States Patent
Spring

(10) Patent No.: US 6,754,703 B1
(45) Date of Patent: *Jun. 22, 2004

(54) NETWORK MANAGEMENT USING ABSTRACT DEVICE DESCRIPTIONS

(75) Inventor: Maximilian J. Spring, San Jose, CA (US)

(73) Assignee: Cisco Technology Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/336,284

(22) Filed: Jan. 3, 2003

Related U.S. Application Data

(63) Continuation of application No. 09/334,766, filed on Jun. 16, 1999, now Pat. No. 6,549,943.

(51) Int. Cl.[7] .......... G06F 15/173

(52) U.S. Cl. .......... 709/223; 709/201; 709/202; 709/203; 709/224

(58) Field of Search .......... 709/201, 202, 709/203, 223, 224

(56) References Cited

U.S. PATENT DOCUMENTS 5,434,775 A * 7/1995 Sims et al. .......... 705/8
5,594,657 A * 1/1997 Cantone et al. .......... 716/16
5,684,988 A * 11/1997 Pitchaikani et al. ..... 707/104.1
5,864,865 A 1/1999 Lakis
6,076,106 A 6/2000 Hamner et al.
6,083,276 A 7/2000 Davidson et al.
6,104,868 A 8/2000 Peters et al.
6,122,639 A 9/2000 Babu et al.
6,191,768 B1 * 2/2001 Imamura .......... 345/98
6,219,703 B1 4/2001 Nguyen et al.
6,226,788 B1 5/2001 Schoening et al.
6,253,195 B1 6/2001 Hudis et al.
6,549,943 B1 * 4/2003 Spring .......... 709/223

* cited by examiner

*Primary Examiner*—Nabil El-Hady
(74) *Attorney, Agent, or Firm*—Hickman Palermo Truong & Becker LLP

(57) ABSTRACT

A method and apparatus are disclosed for creating and storing information that defines one or more network devices for use with a network management system. In one aspect, a network device having one or more logical slots, each of which may contain one of a plurality of sub-components, may be defined in terms of a logical expression that is evaluated by the network management system at runtime. A containment tree representing physical hardware and software elements of the network device is created and stored in memory. The logical expression is evaluated, based in part on a value that is obtained in real time from the network device using a dynamic discovery operation. A node representing the actual sub-component present in the slot of the device at runtime is created and stored in the tree based on the result of evaluating the expression.

41 Claims, 9 Drawing Sheets

NETWORK MANAGEMENT USING ABSTRACT DEVICE DESCRIPTIONS

CROSS-REFERENCE TO RELATED APPLICATIONS; PRIORITY CLAIM

This application claims domestic priority under 35 U.S.C. §120 as a Continuation of prior application Ser No. 09/334,766 filed Jun. 16, 1999 now U.S. Pat. No. 6,549,943 issued Apr. 15, 2003.

FIELD OF THE INVENTION

The present invention generally relates to data processing. The invention relates more specifically to methods and mechanisms for creating and storing information that defines one or more network devices for use with a network management system, including a method by which information about a network device may be created and represented using an abstract device definition language.

BACKGROUND OF THE INVENTION

Computer networks have become ubiquitous in the home, office, and industrial environment. As computer networks have grown ever more complex, automated mechanisms for organizing and managing the networks have emerged. These mechanisms are generally implemented in the form of computer programs that are known as network management systems.

FIG. 1 is a simplified diagram of a network 100 that is managed by a network management station 10. The network 100 comprises one or more network devices 102, such as switches, routers, bridges, gateways, and other devices. Each network device 102 is coupled to another network device 102, or to one or more end stations 120. Each end station 120 is a terminal node of the network 100 at which some type of work is carried out. For example, an end station 120 is a workstation, a printer, a server, or similar device.

Each network device 102 executes a network-oriented operating system 110. An example of a network-oriented operating system is the Internetworking Operating System (IOS) commercially available from Cisco Systems, Inc. Each network device 102 also executes one or more applications 112 under control of the operating system 102. The operating system 102 supervises operation of the applications 112 and communicates over network connections 104 using an agreed-upon network communication protocol, such as Simplified Network Management Protocol (SNMP). The applications may include an SNMP agent that can send and receive messages using SNMP.

Each device 102 stores its current configuration, and other information, in a Management Information Base (MIB) 114. Information in the MIB 114 is organized in one or more tables of one or more MIB variables. The network management station 10 can send fetch and set commands to the device 102 to retrieve or set values of MIB variables. Examples of MIB variables include SysObjID or SysOID. MIB structures and functions are described in detail in D. Perkins et al., "Understanding SNMP MIBs" (Upper Saddle River, N.J.: Prentice-Hall, 1997), and Request For Comment (RFC) 1213.

Preferably the network management station 10 is a general-purpose computer system of the type shown and described further herein in connection with FIG. 8. The network management station 10 executes one or more software elements that carry out the functions shown in block diagram form in FIG. 1. For example, the network management station 10 executes a basic input/output system (BIOS) 20 that controls and governs interaction of upper logical layers of the software components with hardware of the network management station. An example of a suitable BIOS is the Phoenix ROM BIOS. The network management station 10 also executes an operating system 30 that supervises and controls operation of upper-level application programs. An example of a suitable operating system is the Microsoft Windows NT® operating system.

The network management station 10 executes a network management system 40 that interacts with a database 60 containing information about the managed network 100. The network management system 40 is an example of a network management application. Using a network management application, a manager can monitor and control network components. For example, a network management application enables a manager to interrogate devices such as host computers, routers, switches, and bridges to determine their status, and to obtain statistics about the networks to which they attach. The network management application also enables a manager to control such devices by changing routes and configuring network interfaces. Examples network management applications are Cisco Resource Manager, and CiscoView, each of which is commercially available from Cisco Systems, Inc.

The network devices 102 of a typical network are diverse and can be classified in families of similar kinds. Each family has many versions of hardware, firmware, and software. Often, a management operation applied to certain elements of a device is the same as the operation applied to all other devices. However, there also may be differences in methods of management between families of devices. Further, a family of devices generally shares many properties and therefore management of the members of a family is generally similar. However, there may also be differences among members of a family. Differences may also exist among executable program modules within a device.

Releases of new devices and their firmware or software appear as soon as development is complete and a market exists. Thus, the need to manage the devices arises upon the release of a new device, a hardware revision, or new firmware or software. In some past approaches, the network management system 40 is updated on a schedule different from the release schedule of managed devices. Each new release of the network management system 40 includes new functions that handle devices that came on the market or were installed in the network since the last release. However, this approach is widely viewed as undesirable, because until the next release of the network management system 40 appears, it cannot manage the new devices.

In an alternative approach, a new network device is defined in a device description file that can be read by the network management system 40 and incorporated in it at run-time. The device description file is delivered to the field independently of major releases of the network management system 40. Preferably, a developer creates and stores ("develops") one or more device descriptions (each called a "DD") and groups them in a "device package." The device package may be distributed to an end user who already has installed and is using a network management system. When the new device package is installed, the user may manage a new type of device.

In this approach, the device description identifies characteristics of hardware or software modules that are used in or executed by a particular device. However, sharing the device modules among different devices is virtually impossible.

Further, each device family must implement all management definitions. Also, there are no functional abstractions that can be used to create a device description for a new device.

Further, in one past approach, the developer must specify a device description using one programming language that executes in the same system as the core functions ("engine") of the network management system. Each device is specified using a Coded Device Description ("CDD") in which each device description is coded using structures that are not specifically designed for the purpose of modeling devices. These limitations are inconvenient. A network management system is increasingly viewed as a development environment rather than merely an application program. A good network management system enables a user ("device developer," or "developer") to create and store new device descriptions. The new device descriptions enable the network management system to support a new specific type of device. A successful network management system enables such device descriptions to be developed easily and rapidly.

Based on the foregoing, there is a clear need to provide improved management of devices between major releases of a network management application. There is also a need to provide automated management of new or different kinds of devices that become available after installation of a network management application.

In particular, there is a need to automatically integrate information about a new or different device with the network management application, without the requirement of releasing a revision of the entire network management application.

There is also a need to efficiently integrate information about a parent device with the network management application so that a child device, having a family relationship or hierarchical functional relationship to the parent device, is integrated into the network management application using a minimum of new code and storage space and a minimum or re-coding on the part of the developer There is also a need to create a set of abstractions whereby the operations on and data acquired from the devices of a network may be managed and understood in common rather in isolation.

There is a particular need for a system that can accomplish the foregoing in a way that is optimized and customized for the tasks of the device developer.

SUMMARY OF THE INVENTION

The foregoing needs, and other needs and objects that will become apparent in the following description, are fulfilled in the present invention, which comprises, in one aspect, a method of creating and storing information that represents a logical description of a network device for use in a network management system. A tree that represents a logical hierarchy of the components of the network device is created and stored, based on a textual description of physical components of the network device, wherein the description includes a logical expression. A first node of the tree that represents a logical slot of the network device that may be configured with one of a plurality of sub-components is created and stored. A result value is created and stored by evaluating the logical expression using a value that is obtained from the network device. One of the sub-components is selected, based on the result value. A second node is selected as a child node of the first node, wherein the second node represents the selected one of the plurality of sub-components.

In one feature, creating and storing a tree further involves creating and storing a tree that logically represents the components of the network device. The tree comprises a third node representing the device type and one or more component nodes that represent hardware or software elements of the network device, and creating and storing the first node as a child node of the third node.

According to another feature, the method further comprises creating and storing the textual description in the form of one or more stored device descriptions, each device description comprising a definition of a device type node and one or more component type nodes. Another feature involves creating and storing the textual description in the form of one or more stored device descriptions. Each device description comprises a definition of a device type node, one or more component type nodes, and one or more slot type nodes. Each of the slot type nodes includes a logical expression that can be used to select a sub-component node that is contained within that slot type node.

In yet another feature, creating and storing a result value includes creating and storing a result value by evaluating the logical expression using a value for a variable in the expression that is obtained from the network device. In still another feature, creating and storing a result value includes creating and storing a result value by evaluating the logical expression using a value for a variable in the expression that is obtained from the network device in real time at a time at which the tree is created and stored. A related feature is that creating and storing a result value may include creating and storing a result value, by evaluating the logical expression using a value for a variable in the expression that is obtained from the network device in real time at run time of the network management system.

Further, creating and storing a result value may include creating and storing a result value by evaluating the logical expression using a value for a variable in the expression that is obtained from the network device in real time upon initialization of the network management system. As another alternative, creating and storing a result value may include creating and storing a result value by evaluating the logical expression using a value for a variable in the expression that is obtained from the network device in real time using a dynamic device discovery operation of the network management system.

The invention also encompasses other methods, apparatus, and products, as set forth in the following disclosure and as recited in the appended claims.

BRIEF DESCRIPTION OF THE DRAWINGS

The present invention is illustrated by way of example, and not by way of in the figures of the accompanying drawings and in which like reference numerals refer to similar elements and in which.

DETAILED DESCRIPTION OF THE PREFERRED EMBODIMENT

A method and apparatus for creating and storing information that defines one or more network devices for use with a network management system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional Overview

An embodiment of the invention may be implemented in the context of one or more software elements that form a part of a network management system. As used in this document, the following words, acronyms, and actions have the meanings set forth below. The reader is assumed to be familiar with general terminology and technical information pertaining to contemporary computer networks and internetworking. A general introduction is provided in D. Comer, "Computer Networks and Internets" (Prentice-Hall, 1997).

"ADD" means an Abstract Device Description that describes relevant features or devices to be managed by a network management system.

"CDD" means a Coded Device Description, which is the result of compiling one or more ADDs.

"DD" means a Device Description, which generally is a text file that describes characteristics of a network device.

"Network management system" means a system that manages switched and routed networks and internetworks. An example of a network management system is Cisco Works For Switched Internetworks (CWSI).

"Discovery" means initial acquisition of sets of network data from sets of network devices in the network that is managed by the network management system.

"Polling" means periodic acquisition of sets of network data from sets of network devices in the network that is managed by the network management system.

According to an embodiment, a network management system is improved by providing mechanisms that enable a network management application developer to model device-specific knowledge by using Abstract Device Descriptions. A device developer may write a device package that is used by the network management system independently of the development of the engine of the network management system. Accordingly, the device package can be installed later into an instance of the network management system that is already in operation. In this way. the network management system may be updated dynamically to work with a new or different device, device family, or device type.

Figure 1:
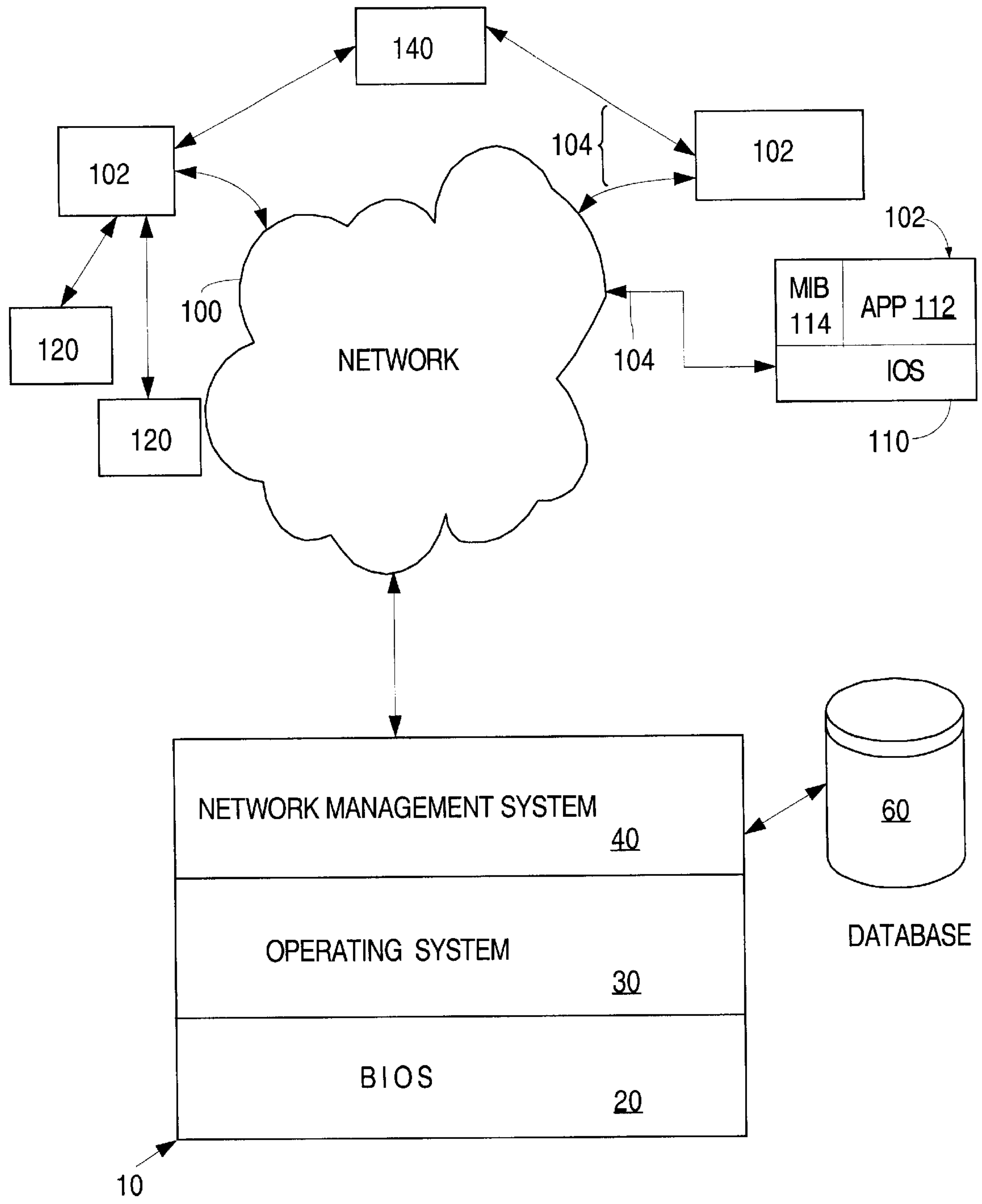
FIG. 1 is a block diagram of a managed network and a network management station.
Figure 2A:
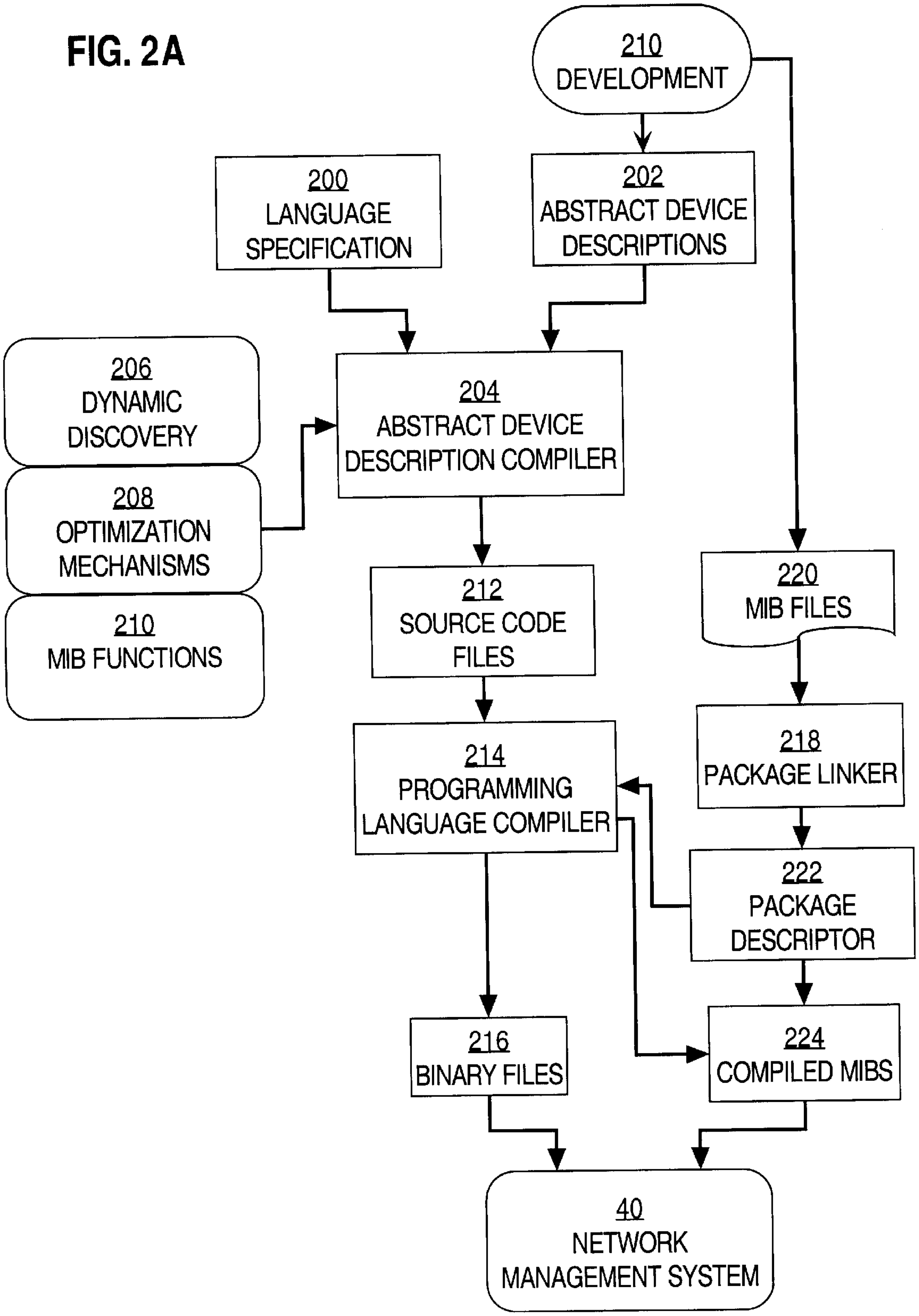
FIG. 2A is a block diagram of elements of an improved network management system at uses abstract device descriptions, as used at development or compilation time.

FIG. 2A is a block diagram of elements of an improved network management system that uses abstract device descriptions. The elements of FIG. 2A are typically created and used during development of one or more descriptions for new devices, as indicated by block 210. A language specification 200 of an abstract device description language is used to create and store one or more abstract device descriptions 202.

Language specification 200 is defined according to a context-free grammar. Broadly, the approach of nesting several syntaxes into one is analogous to the approach taken by the syntax of the well-known parser generator YACC. Further, language specification 200 conforms to the ASN.1 standard set forth in D. Steedman, "Abstract Syntax Notation One (ASN.1): The Tutorial and Reference," Technology Appraisals, Isleworth, 1993. Conventionally, ASN.1 is used to write MIB files. The ADD language also comprises language constructs that may be used to define features of a managed device. The functional definitions that are reflected in the definition constructs are written in a Java-like syntax with extensions. Embedded within functional definitions, an object designator syntax is used to specify references to values coming from the device. Generally, the values represent MIB variables.

In the preferred embodiment, each ADD 202 is represented by one or more stored source files. Each source file may be a text file. Each file has one module. One or more source files are associated with a device package.

To add the device-specific information of ADD 202 to an installed instance of network management system 40, all the source modules of the ADD are compiled by an ADD compiler 204 into one or more source code files 212. In carrying out compilation, ADD compiler 204 uses or has knowledge of dynamic discovery 206, optimization mechanisms 208, and MIB functions 210, which are described further below. The ADD compiler includes a LL(k) parser, the design and implementation of which are described in Aho et al., "Principals of Compiler Design" (Reading, M A: Addison-Wesley, 1977).

Source code files 212 are generated according to a conventional programming language. For example, in the preferred embodiment, source code files 212 generated by the ADD compiler as Java® source code. However, embodiments described in this document are not limited to Java, and any mention of the term "Java" in this document is meant to be exemplary and not limiting. Any conventional compiled or interpreted programming language may be used.

Source code files 212 are compiled by a compiler 214 of the conventional programming language into one or more binary files 216. For example, the Java source code may be compiled by a Java compiler into one or more binary class files.

At compilation time, one or more MIB files 220 are provided to a package linker 218. The MIB files contain pre-determined definitions of MIBs that are contained in the real-world network device that is represented by ADD 202. As output, package linker 218 produces a package descriptor 222. The compiler 214 compiles the package descriptor 222, and as a result, creates and stores one or more compiled MIBs 224.

Figure 2B:
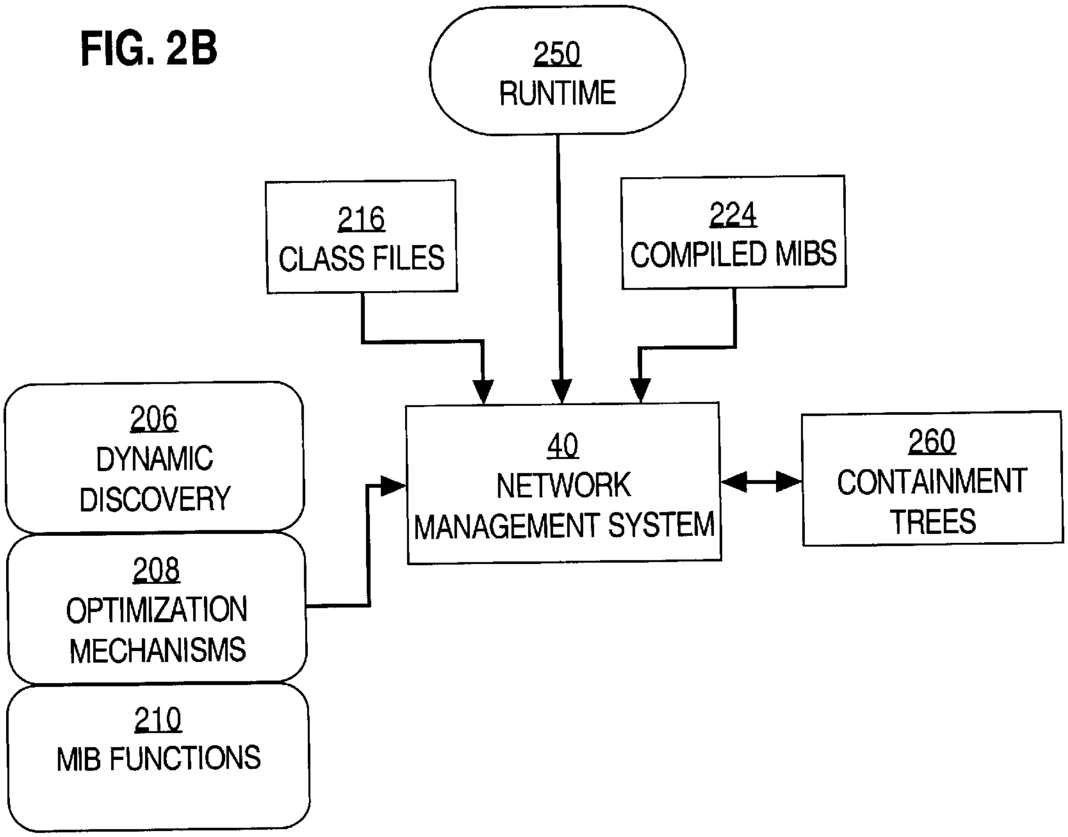
FIG. 2B is a block diagram showing a run time process of incorporating binary files and compiled MIBs into a network management system.

FIG. 2B is a block diagram showing that binary files 216 and compiled MIBs 224 may be incorporated into the network management system 40 at run time, as indicated by block 250. In one embodiment, re-starting the network management system 40 causes the class files 216 and compiled MIBs 224 to be incorporated into the network management system. The network management system reads the binary files and incorporates the information therein into the memory models and other stored information that is used by the network management system in operation. Importantly, the ADD 202 and source code files 212 are not needed by the network management system 40 at run-time. This improves efficiency and protects them from unauthorized modifications.

Concise Representation of Devices Using Trees

Based on the information in class files 216, one or more containment trees 260 are created to represent managed devices in memory. Each containment tree is a data structure, stored in memory that is accessible to the network management system 40 for use by that system during execution, which is an abstract, hierarchical representation of relationships of physical and logical parts of a device. For example, each device contains one or more circuit board ("cards"). Each card may contain one or more sub-cards. Each card or sub-card may contain one or more ports. Cards, sub-cards, and ports are represented as nodes, and containment relationships of such parts are represented by connecting the nodes in a tree. Collectively, nodes of the tree are called components.

Preferably, each component of a device tree is defined by a developer using specific ADD language constructs. In the preferred embodiment, the ADD language includes three constructs useful in defining containment relationships of components: DEVICE TYPE, COMPONENT TYPE, SLOT TYPE.

Figure 4:
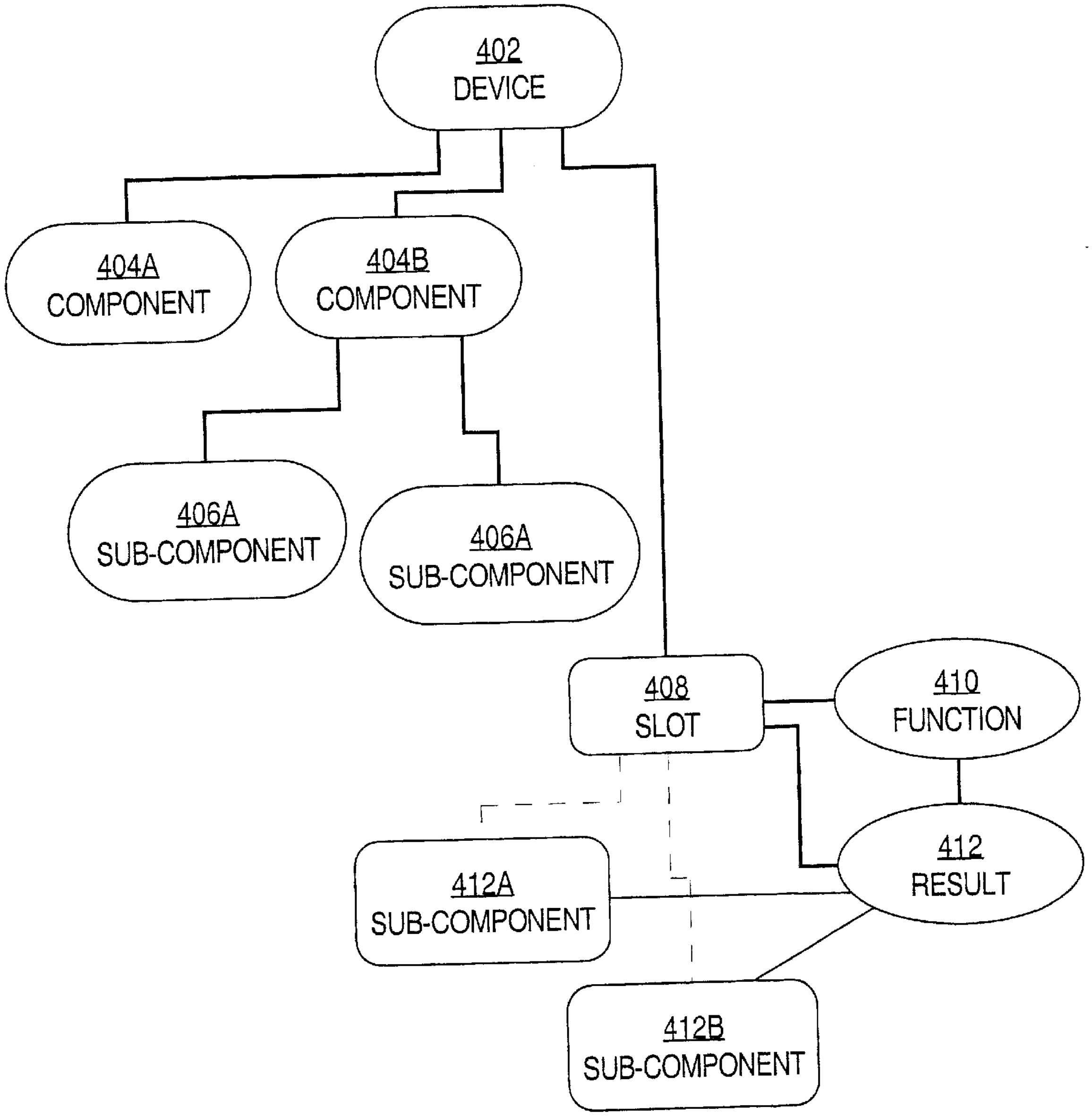
FIG. 4 is a block diagram of the elements of a containment tree.

FIG. 4 is a block diagram of the elements of a containment tree. Device node 402 of the tree of FIG. 4 is a root node. The root node of a device containment tree is defined in an ADD 202 using a DEVICE TYPE construct. With a DEVICE TYPE construct, the developer may specify one or more MIB variables, such as sysObjectID, that are stored in MIBs of the corresponding device 102. Each MIB variable is represented in the construct by using an object designator. The developer may also define an additional condition in order to express whether the corresponding tree matches a particular physical device.

As shown in FIG. 4, the device represented by device node 402 has two components represented by component nodes 404A, 404B. The component nodes represent specific hardware or software elements of a device. Using a COMPONENT TYPE construct, a developer may define one or more parent-child relations among physical elements of a device. The COMPONENT TYPE construct is used for relations that can be defined statically. For example, a developer may specify that a particular card type X contains exactly N ports of type Y.

Parent-child relations may also be defined dynamically, according to the actual configuration of a device in a managed network, based on information that is obtained from the device at runtime. In a dynamic device containment tree definition, a device discovery operation occurs at run-time. The structure of the containment tree is created at run-time based on the result of the device discovery operation or additional information received from the device based on that operation. For example, a particular device type X may contain a card Y only if MIB variable Z has the value V. An ADD 202 may have a SLOT-TYPE construct to define such a relationship.

As shown in FIG. 4, a tree may include a slot node 408 that is defined by a SLOT-TYPE construct. The slot node 408 is associated with a function 410 or an expression in a programming language. At run-time, function 410 is executed and produces a result 412. Depending upon the value of result 412, slot 408 is associated with a first sub-component node 412A or a second sub-component node 412B.

Typically, evaluation of function 410 is carried out when network management system 40 initializes and incorporates a CDD 216 into its memory models. Any number of sub-components 412A, 412B may be specified; embodiments are not limited to two alternatives. Using one or more construction parameters, a device definition may pass context information from a parent component to a child component when the network management system incorporates the abstract device definitions into its memory models.

The following example demonstrates how the foregoing mechanisms may be used to define a set of trees concisely.

```
Dev DEVICE-TYPE
::= { Card(1), Card(2), Card(3) }
Card(cardNo INTEGER) SLOT-TYPE
::= { {cardTypeInSlot(cardNo) == 4711} CardA,
      {cardTypeInSlot(cardNo) == 4712} CardB
    }
CardA COMPONENT-TYPE ::= { PortA, PortA }
CardB COMPONENT-TYPE ::= { PortB, PortB, PortB }
```

In this example, four definitions define a representation of a network device that has three physical slots. The name of the device is Dev. The slots are defined by the construct {Card(1), Card(2), Card(3)}. In the physical device, each slot may contain a card of type CardA, CardB, or may be empty, depending whether a function 'cardTypeInSlot' returns a result of "4711", "4712", or neither. The function 'cardTypeInSlot' is pre-defined by the developer; generally, it would perform SNMP requests of one or more corresponding MIB variables. The COMPONENT TYPE constructs specify that a card of type CardA contains always two ports of type PortA, whereas CardB contains three ports of type PortB. The port types are defined by the developer elsewhere in the ADD file.

The object designators that are used in the foregoing constructs may be associated with device objects other than MIB variables. For example, an object designator may refer to a value retrieved through HTTP.

Thus, an innovative containment tree structure is provided, in which a tree may be created and stored dynamically. Using the SLOT-TYPE construct, a tree may be defined with a variant structure that matches a variable configuration of a real-world network device. The specific structure with which the tree is created and stored is determined at run-time, according to values that are resolved at run time. As a result, a complex tree representing a family of numerous related, different network devices may be defined concisely.

Optimized Mechanism for Referencing Device Values

A device description may include one or more algebraic expressions. For example, as described above, a device type can be defined in part by an algebraic expression that relates elements of the device to numeric values that are stored in the device. An expression may define a function to be carried out when a user is working with a particular device type using the network management system.

An expression may include one or more references to values that are retrieved from the device at run time, using one or more object designators. For example, the following SNMP designator refers to an integer representation of the value of the cardNo'th instance of the MIB variable cardType. Assume that the identifier cardNo is previously defined as a construction parameter.

```
'cardType,cardNo'.intVal( )
```

Using this syntax, a device description may reference a device value symbolically. The language syntax conceals the fact that complex, time-consuming operations must occur at run-time to retrieve the corresponding value from the device. For example, a particular expression may require, at runtime, an SNMP request to be sent, and the response to be analyzed.

In an embodiment, the ADD compiler automatically generates code to address these details. For example, source code is generated, in a standard programming language, in which an SNMP request is sent to the network device earlier than when the value is actually needed for evaluation of the expression. Further, the compiler will identify and combine multiple references to the same value for the same device. As a result, only one request, corresponding to all the multiple references, is sent to the device for that value.

Figure 5:
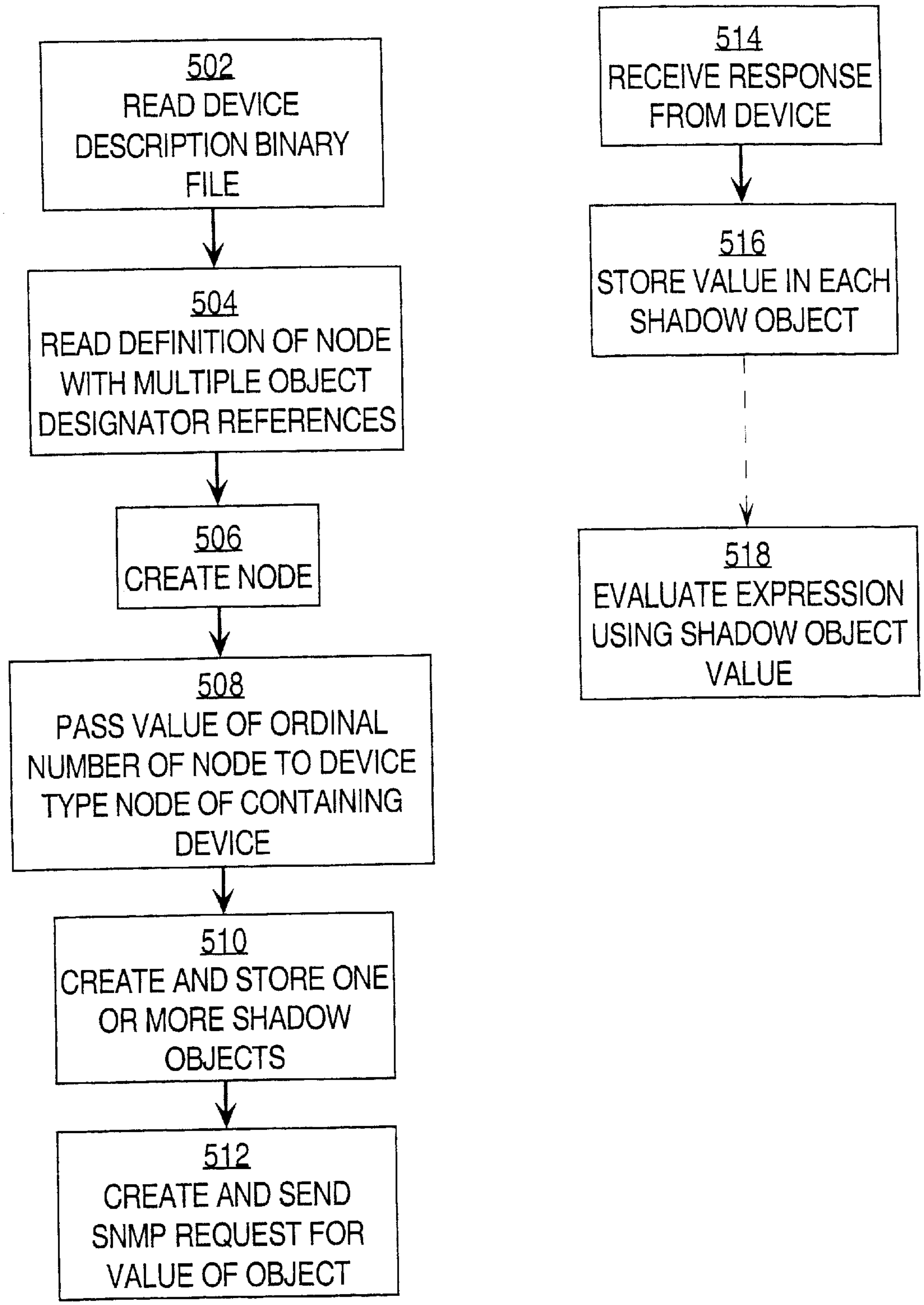
FIG. 5 is a flow diagram of a preferred embodiment of a process of optimizing references to device values.

FIG. 5 is a flow diagram of a preferred embodiment of a process of optimizing references to device values. In the following discussion of FIG. 5, assume that a device description is created and stored using the SNMP object designator given above, and the following definition of a Card node:

```
Card(cardNo INTEGER) SLOT-TYPE
::= { {'cardType,cardNo'.intVal( ) == 4711} CardA,
      {'cardType,cardNo'.intVal( ) == 4712} CardB
    }
```

In the preferred embodiment, based on such a device description, the ADD compiler recognizes that the device description contains multiple references to the object designator 'cardType,cardNo'.intValo. In response, the ADD compiler identifies the multiple references, and automatically generates code to carry out the steps of FIG. 5 at runtime.

In block 502, a compiled binary file representing the device description is read. At block 504, the definition of a node containing multiple object designator references is encountered. For example, assume that the network management system encounters the definition of the Card node. In response, a node of type Card is created, as shown in block 506. Concurrently, as shown in block 508, a value representing the ordinal number of the current node is passed to the root node or device type node that represents the device that contains the current node. For example, when a card of type Card is constructed, the integer value representing the card's ordinal number (1, 2, or 3) is passed via the construction parameter cardNo to a device type node which represents the physical network device that contains one or more Cards.

As shown in block 510, one or more shadow objects are instantiated and references to them are created and stored. For example, immediately after the device type node receives the cardNo value, a shadow object for 'cardType, cardNo' is instantiated and a reference to it is created and stored. Each shadow object is an embodiment, created and used at run-time, of an object designator.

At the same time, or as part of this operation, a corresponding SNMP request is created and sent to the actual network device, as indicated in block 512. In block 514, a response to the SNMP request is received. In block 516, the requested value in the SNMP request is stored in each shadow object for 'cardType,cardNo'.

Normally, code for carrying out the steps of block 502 through block 516, inclusive, is automatically generated at compile time by ADD Compiler 204. The ADD Compiler 204 may be configured with a lexical analysis stage that can recognize a device description having a node definition that contains an expression with multiple references to the same object designator. The ADD Compiler 204 may have a code generator stage that may automatically generate code to execute the steps of block 502 through block 516 in response to recognition of this lexical context by the lexical analyzer.

In addition, the code that corresponds to block 502 through block 516 is preferably executed during an initialization phase of the network management system. In this way, the SNMP request for a value for the object designator is created and sent long before the network management system encounters or needs to evaluate the expression that contains the object designator.

At a later phase of run time, as indicated by the dashed line connecting block 516 and block 518 in FIG. 5, the value obtained from the device is actually used. For example, in block 518, the expression is evaluated using the shadow object.

In one embodiment, the foregoing process may be implemented by configuring the ADD compiler to automatically generate the following code for the SLOT-TYPE Card specified above:

```
class Component_Card extends ComponentDD{
    ShadowObject $so0; // 'cardType,cardNo'
    int cardNo;
    void acceptCArgs(int p$cardNo){
        cardNo = p$cardNo;
        $so0 = createSO(Dsg.get("cardType").inst(cardNo));
    }
    ComponentDD m$discover( ){
        if ($so0.scalar( ).intVal( )==4711){ return new Component_CardA( ); }
        if ($so0.scalar( ).intVal( )==4712){ return new Component_CardB( ); }
        return null;
    }
}
```

Thus, an SNMP request is created and dispatched before a particular MIB value is actually needed to evaluate an expression. Accordingly, later, when the value is actually needed to evaluate an expression, it is highly likely that the corresponding response will have been received (especially in a common scenario where multiple instances of the Card node are present with different cardNo values and the requests for the corresponding MIB variables can go out in one SNMP request), so that the value is already available and the expression may be evaluated immediately. If the response has not yet arrived, then any call to get the value is blocked until the response arrives.

Example Data Flow

The end of this description provides a set of ADD definitions that describe the containment tree of an example network device.

Figure 6:
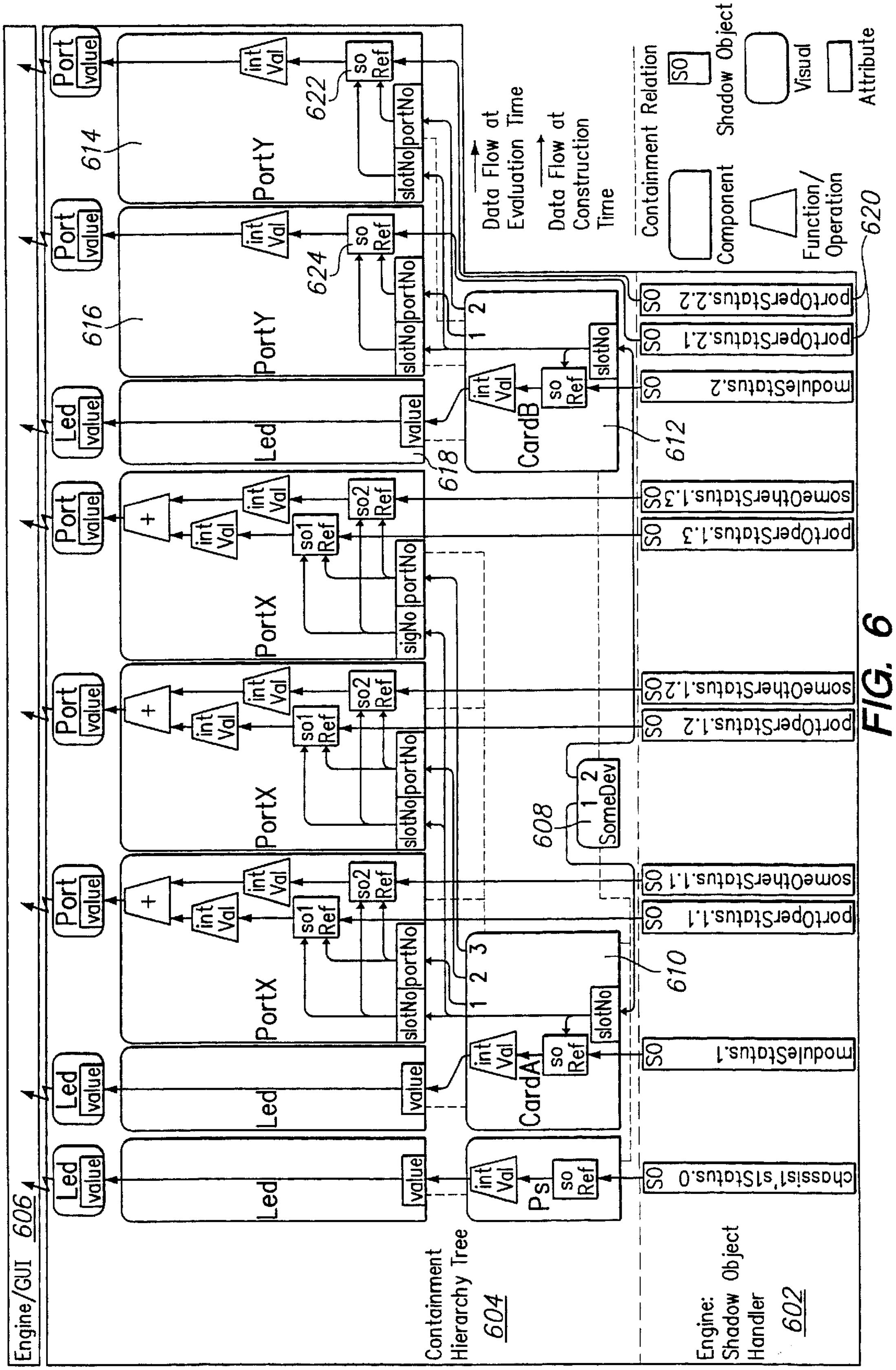
FIG. 6 illustrates data flow at construction time and at evaluation time, for one polling cycle, within a containment hierarchy of the network device.

FIG. 6 illustrates data flow at construction time and at evaluation time, for one polling cycle, within a containment hierarchy of the network device. ADD compiler 204 includes a shadow object handler 602 that creates and processes shadow objects. When an ADD is compiled, the ADD compiler 204 creates and stores a containment hierarchy tree 604 having one or more data structures that represent elements of the network device that is being defined. For example, tree 604 may include a root object 608 that represents the device generally, and one or more card objects 610, 612, each of which may have port objects 614, 616.

Each port object or card object may contain references to one or more MIB values. For each such reference, ADD compiler 204 uses shadow object handler 602 to create a shadow object 620 and a corresponding shadow object reference 622, 624 in the port object or card object corresponding to an ADD definition that references a MIB value. At runtime, discovery or polling is used to obtain values from MIB variables in the real corresponding device. The values from the MIB variables are stored in the shadow objects 620. When network management system 40 references tree 604, the port objects and card objects obtain values by tracing the shadow object references 622, 624 to shadow objects 620. As a result, a single discovery or polling operation may be used to obtain a MIB variable value and propagate it to multiple references to the same value in the tree 604.

Structural Overview

A structure and syntax of a programming language that may be used to create and store ADDs, which function as described above, is now described. The language is useful in several elements or places in which a developer may wish to express arbitrary device functionality. These elements and places are associated with one or more explicit constructs within the syntax of ADD, and with one or more places within the CDD. Accordingly, in the preferred embodiment, a hybrid language is provided comprising several different syntaxes that are integrated in way to reflect the needs of a developer as naturally as possible.

Figure 3A:
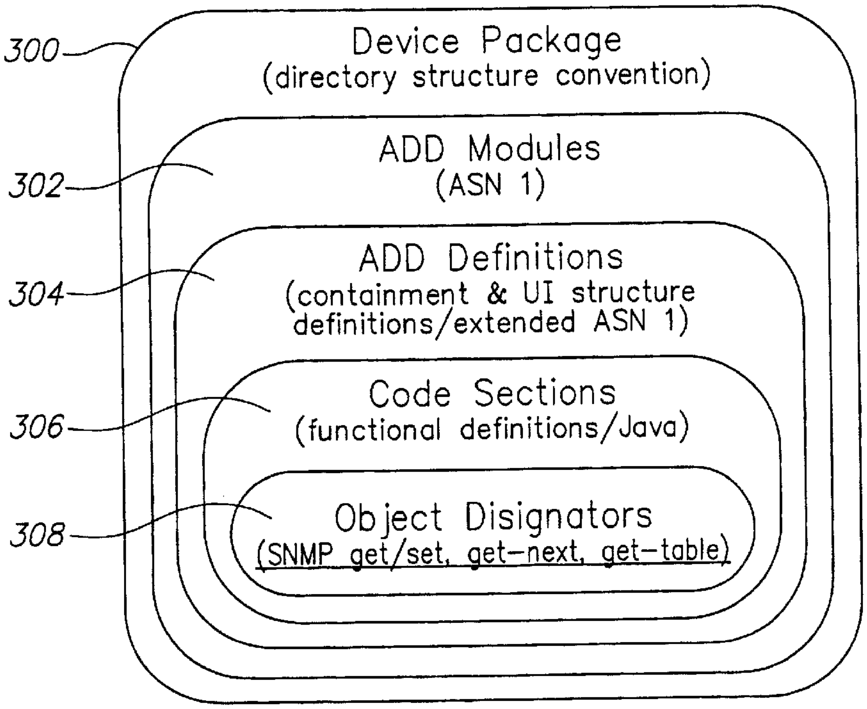
FIG. 3A is a block diagram that illustrates relationships among syntaxes of an abstract device description language.

FIG. 3A is a block diagram that illustrates relationships among such syntaxes. One or more abstract device definitions are stored in one or more device packages 300. Each device package 300 is provided as input to the network management system and is read and incorporated into the memory model of the network management system when it initializes. Each device package 300 is organized in the form of one or more files that are maintained according to a conventional file system directory structure.

Each device package 300 may contain one or more ADD modules 302. Preferably, each of the ADD modules 302 comprises one or more definitions in the ADD language, which conforms to the syntax described in this document. The preferred syntax conforms to the conventions of Abstract Syntax Notation One (ASN. 1).

Each of the ADD modules 302 may contain one or more ADD definitions 304. Each of the ADD definitions 304 expresses the structure of a network device in terms of the physical or logical elements that the device contains. An ADD definition 304 may also express the structure of a user interface (UI) that is used by the network management system to communicate with a network administrator about the device. Preferably, each ADD definition 304 is expressed in the form of the ADD language described in this document.

Each of the ADD definitions 304 may contain one or more code sections 306. Each code section 306 expresses one or more functions for execution by the network management system with respect to the device that is being defined. Each code section 306 is expressed in a computer programming language, such as Java®. Each of the code sections 306 may contain one or more object designators 308. Each of the object designators 308 identifies a MIB variable that may be the subject of an SNMP get operation, set operation, get-next operation, or get-table operation.

Figure 3B:
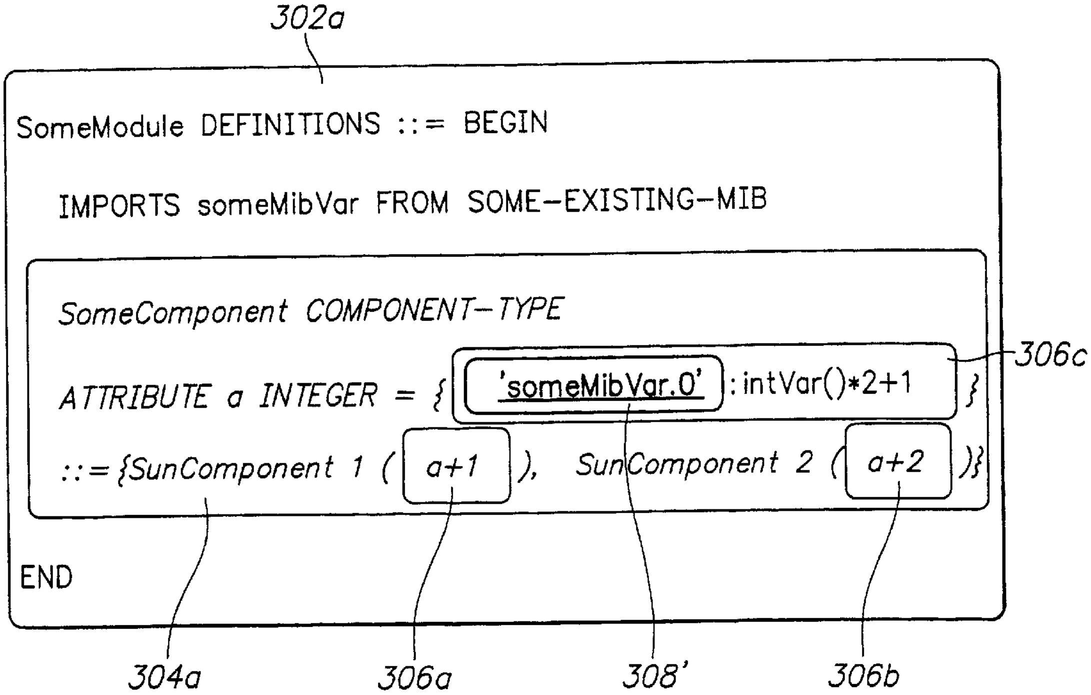
FIG. 3B is a diagram of an excerpt of an exemplary device package that illustrates how the elements of FIG. 3A correlate to an abstract device description.

FIG. 3B is a diagram of an excerpt of an exemplary device package that illustrates how the elements of FIG. 3A correlate to an abstract device description. In the example of FIG. 3B, there is one ADD module 302*a*, named SomeModule. It contains one ADD definition 304*a*, named SomeComponent. The ADD definition 304*a* contains code sections 306*a*, 306*b*, 306*c*. One code section 306*c* contains an object designator 308' that identifies a MIB variable named SomeMibVar.0.

General Mechanisms of the ADD Language

To describe the context-free syntax of the ADD language, a grammar having a form similar to Backus-Naur Form (BNF) is presented. The grammar consists of a plurality of productions, each having the form <left-hand-side>'=' <right-hand-side>, without a trailing period. The left-hand side consists of a non-terminal element, whereas the right-hand side of a production is a sequence of non-terminals, terminals, or applications of grammar operators. A non-terminal is an alphabetic identifier consisting of at least one lower-case letter. A terminal is an arbitrary character sequence enclosed by double quotes ("), or an identifier consisting solely of upper-case letters and dashes (-), or an identifier consisting solely of upper-case letters enclosed by angular parentheses (< >) and representing a character sequences as defined in a regular expression which is defined in the end of this description. The following grammar operators are defined, in the order of highest to lowest precedence:

| | |
|---|---|
| ( x ) | Precedence change |
| ( x )* | Repetition (zero or more times) |
| ( x )+ | Repetition (one or more times) |
| [ x ] | Option |
| x y | Concatenation |
| x \| y | Alternative |

A semicolon indicates a grammar comment which extends to the end of the same line and which does not affect the semantics of the corresponding grammar rule. The appearance of an ellipsis within a grammar rule indicates that something has been omitted, generally because it is either clearly apparent, or of no special interest in the current context.

Node Types

In general, an ADD defines one or more trees, in which each tree represents a network device that is discovered at runtime of the network management system. Each tree represents the hierarchy of components of the device, a menu, and a dialog for configuration and monitoring of each component. Each tree has one or more nodes. A node may be related to other nodes in a parent-child relation. In that case, the first node is called a parent node and the latter nodes are called child nodes or children. Nodes without a parent node are called root nodes. Nodes without children are called leaf nodes.

The structure and properties of nodes are described by node type definitions. Each node type definition associates one or more child node types with a name. The name enables the node type definition to be referenced elsewhere. A single node type definition may have the form:

```
NodeType::={ChildType1, ChildType2, . . . , ChildTypeN}
```

Within a containment hierarchy, nodes are called components. In a configuration dialog representation, nodes are called elements.

Expressions

In a node type definition, an expression may be specified in several places. Preferably, each expression follows the syntax of Java expressions. An expression can apply values of parameters and attributes declared locally to a node type. Further, an expression may use values coming from the actual device by referencing one or more object designators. Circular references may not be introduced. For example, other attributes may not be referenced inside an attribute initialization expression, if these other attributes references the initializing attribute themselves.

An expression yielding a Boolean result is called a condition. In one embodiment, a condition expression has the form:

```
Expr = ... ; Java expression possibly containing object designators
Condition = "{" Expr "}" "?" ; with result type Boolean
```

Data Types

ADD is a strongly typed language. Therefore, every element that holds a value, such as an attribute, parameter, etc., has an associated type which defines the set of values that the element may assume. A type may be specified as a Java type or an ASN.1 type. When an ASN.1 type is specified, then the ADD Compiler maps the ASN.1 type to a Java type according to the following Table 1.

TABLE 1

MAPPING OF ASN.1 TYPES TO JAVA TYPES

| ASN.1 type | Java Type |
|---|---|
| INTEGER | int |
| Integer32 | int |
| Unsigned32 | long |
| Gauge | long |
| Gauge32 | long |
| Counter | long |
| Counter32 | long |
| Counter64 | java.math.BigInteger |
| TimeTicks | long |
| OCTET STRING | byte[] |
| OBJECT IDENTIFIER | SnmpOid |

TABLE 1-continued

MAPPING OF ASN.1 TYPES TO JAVA TYPES

| ASN.1 type | Java Type |
|---|---|
| IpAddress | SnmpIpAddress |
| DisplayString | String |

Accordingly, in the ADD syntax, type references may be defined as:

```
TypeRef = JavaType | Asn1Type
JavaType = ... ; Java type constructor
Asn1Type = ... ; ASN.1 type constructor
```

Construction Parameters

One or more construction parameters may be used to pass information down to a child node immediately after the child node is constructed. Each construction node is using parentheses. In a node type definition, each construction parameter is declared after the node type name by stating its name and type. In a child definition of a node type, each construction argument is written after the child name and consists of an expression. Therefore, in the grammar:

```
ConstructionPars = "(" Parameter ( "," Parameter )* ")"
Parameter = Identifier TypeRef
```

An example of a node type definition with two construction parameters is:

```
NodeType(cPar1 INTEGER, cPar2 INTEGER)
::= { ChildType(cPar1+1), ChildType(cPar2+2) }
```

In this example, cPar1 and cPar2 are declared as construction parameters for NodeType. They receive values after NodeType is instantiated and becomes constructed. Their values are applied within the actual construction argument expressions; the expressions' resulting values are passed down further when constructing NodeType's children.

Attributes

An attribute serves as a placeholder for values resulting from the evaluation of its initialization expression. In the grammar:

```
Attributes = AttrDecl ( "," AttrDecl )*
AttrDecl = Identifier TypeRef "=" AttrInit
AttrInit = "{" Expr "}" | CATCH "{" Expr "}" "{" Expr "}"
```

An example of an attribute declaration within a node type definition is:

```
NodeType
ATTRIBUTE attr INTEGER = { expression }
::= { ChildType(2*attr) }
```

Depending on the place within a node type definition at which an attribute is referenced, an attribute can be a construction attribute or an evaluation attribute, or both. In the example above, "attr" is a construction attribute, only. If there is no reference to a particular attribute, then that attribute is an unbound attribute and is initialized once at construction time.

The order by which attributes are initialized is determined by the ADD compiler. For example, if an attribute "a" refers in its initialization expression to attribute "b", then b is initialized before "a", regardless of the textual appearance of their declarations. However, if there is no particular dependency among a set of attributes, they initialize in the order of their textual appearance. Accordingly, forward references are permitted. However, the ADD compiler detects dependency cycles among attribute initializations.

Certain constant values that may be specified within a node type definition by a separate clause are said to be held in constant attributes, for example, an image or options associated with a component.

Catch Construction

A catch construct can be used to initialize an attribute. If an exception occurs during the evaluation of the first expression, then the exception expression is evaluated. Within the exception expression, the identifier exception can be used to access the thrown exception.

Evaluation Parameters

Evaluation parameters may be used to pass information from a parent node to a child node during evaluation of nodes. For example, an evaluation parameter may pass information from a parent node to a child node during one cycle in which the actual status of a device is polled. An evaluation parameter is specified using braces. In a node type definition, each evaluation parameter is declared after the node type's formal construction parameters using its name and type. In a child definition of a node type, each actual evaluation argument is written right behind the construction arguments of the child, and consists of an expression. This expression can refer to evaluation and construction parameters, whereas construction arguments are restricted to refer to construction parameters, only.

In the grammar:

```
EvaluationPars = "{" Parameter ( "," Parameter )* "}"
Parameter = Identifier TypeRef
```

In the example below, when a node of NodeType becomes evaluated, the sum of the node's evaluation parameters is passed to the first child, and the formal evaluation parameter of the second child is assigned the difference.

```
NodeType(cPar INTEGER){ePar1 INTEGER, ePar2 INTEGER}
::= { ChildType(cPar){ePar1+ePar2}, ChildType(cPar){ePar1−ePar2} }
```

Labels

Within a node type definition, a label may associate a child node with a name, so that the child node can be identified when referencing a child's attribute inside an expression. The following example illustrates use of a label:

```
Card ::= { port1 Port(1),
           port2 Port(2),
           Led{port1.ok && port2.ok}
         }
Port(portNo INTEGER)
ATTRIBUTE ok Boolean = { ...Expression to determine whether the port is ok... }
      ::= ...
Led{status Boolean}
      ::= ...
```

In this example, a node of type Card has two child nodes of type Port. Each Port node has a Boolean attribute representing the actual status of that port. A third child node of Card represents a light-emitting diode (LED) for signaling, in the chassis view, that all ports are operating correctly ("ok"). In the expression for calculating the evaluation parameter of Led, the attributes of the two port children are referenced using the labels of the children.

Iterators

It may be necessary to define a node type with many children. For example, a card of a network device may have 48 ports. An iterator provides a mechanism analogous to a macro mechanism to abbreviate such type definitions. For example, the definition:

```
Card ::= { p1 Port(1), p2 Port(2), p3 Port(3), p4 Port(4), p5 Port(5) }
```

can be abbreviated as:

```
Card ::= { [i={1..5} : p${i} Port(i)] }
```

In the ADD grammar, iterators are defined as follows:

```
Iterator         =  "["
                    IteratorHeader
                    BodyOrIterator ("," BodyOrIterator)*
                    "]"
IteratorHeader   =  IteratorHead ("," IteratorHead)* ":"
IteratorHead     =  Identifier "=" "{" IteratorElement
                    ("," IteratorElement)* "}"
IteratorElement  =  Identifier | Signed [" . . . " Signed]
BodyOrIterator   =  Body | Iterator
Body             =  . . .   ; depends on the context of the iterator
```

Multiple iterator heads may be specified, so that the expression

```
Node ::= { [a={1 . . . 3},b={x,y,z}: Child(a,b)] }
expands to
Node ::= { Child(1,x), Child(2,y), Child(3,z) }
```

Using multiple iterator heads, an iteration terminates when one the corresponding iterator value list is exhausted.

During the expansion of the iterator body, all occurrences of identifiers equal to an iterator variable are replaced by the current iterator value. In addition, to allow "gluing" of identifiers, dollar sign prefixed braces are eliminated completely, so that only the expansion remains. Thus, the grammar further states:

IteratorVariableExpansion=Identifier|"${" Identifier "}"

Expansion of an iterator takes place during compilation of an ADD definition, so that all values determining the iteration must be known at that time. An iterator may not specify a node having a number of children that must be discovered at runtime. Since the iterator range is not restricted to integer values, any other enumeration may be used. For example, identifiers may be used, such that:

```
Node(inst INTEGER) ::= { [s={One,Two,Three}: s(inst)] }
will expand to
Node(inst INTEGER) ::= { One(inst), Two(inst), Three(inst) }
```

Further, iterators may be nested, so that a definition

```
Node ::=   { [ x={1 . . . 3}:
               [ y={1 . . . 4}: Child(x,y) ]
           ]
           }
```

expands to a definition consisting of 12 child nodes:

-continued

```
Node ::=   { Child(1,1), Child(1,2), Child(1,3), Child(1,4),
             Child(2,1), Child(2,2), Child(2,3), Child(2,4),
             Child(3,1), Child(3,2), Child(3,3), Child(3,4)
           }
```

Rules of Scope

The scope of a particular ADD declaration is the region of an ADD specification within which a declared entity can be referenced using a simple name. In ADD there are two major kinds of regions: a complete module and a single node type definition. The scope of an entity imported by the "import" construct is the complete ADD specification in which the import construct appears. The scope of a parameter, attribute or a label, as introduced by a node type definition, is the entire node type definition.

Two ADD constructs, a category of a dialog and a create clause of a table, introduce a local scope. Within the local scope, all declarations defined with such a construct are visible only within that construct itself. ADD allows full usage of forward references. A reference to an entity may be declared textually later.

Object Designators

An Object Designator represents a reference to an external object and also expresses implicitly how to retrieve a value from the external object. An Object Designator may be used within custom code sections as a convenient way to refer to values to be requested from a device without knowing how the underlying mechanism works. Object Designators are SNMP Designators, CLI Designators and HTTP Designators for referencing values to be accessed by Telnet or HTTP.

Accessor Methods

In one preferred embodiment, object designators are used within Java expressions. Accordingly, an accessor method is specified behind the designator to get an actual value from the internal value representation of the designated object so the expression can use it. Accessor methods may use the following list of method signatures:

For object designators denoting a scalar object:

```
com.cisco.nm.lib.snmp.lib.SnmpOid oid();    // object identifier of designated MIB object
                           Object value(); // "generic" value
com.cisco.nm.lib.snmp.lib.SnmpOid oidVal();
                              int intVal();
                             long longVal();
                           String stringVal();
                           byte[] octetVal();
             java.math.BigInteger bigIntVal();
```

The same set of accessor methods is also provided for object designators that denote columnar objects. The accessor methods return an array of the corresponding type:

```
com.cisco.nm.lib.snmp.lib.SnmpOid[] oid();    // object identifier of designated MIB
                                               object
                           Object[] value(); // "generic" value
com.cisco.nm.lib.snmp.lib.SnmpOid[] oidVal();
                              int[] intVal();
                             long[] longVal();
                           String[] stringVal();
```

-continued

```
        byte[][] octetVal();
java.math.BigInteger[] bigIntVal();
```

If an accessor method is not applicable to a certain designated object, an exception will be raised at run-time.

Device Context Prefix

An explicit device context for a particular object designator can be specified by providing, as a prefix for the designator, an expression that evaluates into a device context. For example, the statement newSession("cv-5000-1") .'sysLocation.0' establishes an explicit device context the object designator 'sysLocation.0'.

SNMP Designators

A SNMP Designator represents a reference to a certain MIB variable or to a row of a table of the actual network device, and denotes how to retrieve the value of the variable. Each SNMP Designator is a constituent of an expression and it is surrounded by back quotes. For each SNMP designator, an OID expression denotes the MIB object. In the grammar:

```
SnmpDesignator     = "`" OidExpr [ "@" ObjDsgIndex] "`"
OidExpr            = MibIdentifierDsg ( "." number )* ( "," Expr )*
MibIdentifierDsg   = MibIdentifier | (Identifier | "${" Identifier "}" )*
ObjDsgIndex        = "+"
                   | [WalkAugment] "[" [Expr] "]"
                   | [WalkAugment] "(" [Expr ("," Expr)*] ")"
WalkAugment        = . . . ; see below
```

In the foregoing grammar rules, MibIdentifier denotes an Object Identifier value that is known at the place of the actual designator, for example, by importing the identifier from a MIB file. The element "number" is an integer literal. Expr can be any expression that returns an integer value, and may refer to the values of construction parameters or attributes, as long as no dependency on evaluation parameters or attributes is introduced.

A MibIdentifierDsg may contain one or more identifier and variable references. In that case, a MIB object descriptor is constructed at run-time based on the identifiers and variables that are references. For example:

'chassisPs${psNo}Type.0'--psNo could be a construction parameter

Preferably, multiple occurrences of the same SNMP designator belonging to one node type will be factorized out by the ADD compiler. The network management system is expected to combine multiple occurrences of SNMP designators belong to different nodes so that corresponding requests to the device are optimized.

The ObjDsgIndex of the object designator specifies how the value is retrieved from the device.

Get/Get-next Designators

A get designator comprises an OID expression, and denotes a response value received from an SNMP get request. A get-next designator is indicated by the trailing character sequence "@+" and denotes the response value on a SNMP get-next request. Examples of such designators include:

'modulePortStatus,slotNo'--with slotNo being a construction parameter

'moduleSwVersion.0@+'

Get-column-element/Get-column Designators

A get-column-element designator represents an operation in which a column of MIB values is obtained from a MIB table of a network device. At run-time, a get-column-designator causes one or more SNMP table walk operations to be carried out for one column of a MIB table. Accordingly, the value of the row is retrieved as specified by the row index expression(s).

```
SnmpGetColumn   = "`" OidExpr "@" RowIndex "`"
RowIndex        = "[" [Expr] "]" | "(" [Expr ( "," Expr )*] ")"
```

Two kinds of index expressions are supported, a ranged index expression and a mapped index expression. A ranged index is indicated by brackets. The expression must return an integer value in the range of [0, number of rows−1], regardless of the SNMP index value for the designated MIB table. In a mapped index, a parenthesized expression list represents a set of SNMP index values that denote a certain row (the "keys"). Each expression must return values matching an SNMP index of the designated MIB table.

If a row expression contains no expression at all, the designator is called a get-column designator and it denotes the complete column. A following accessor method returns an array of corresponding values. Examples of the foregoing designators are set forth below.

'moduleType@[slotNo]'--with slotNo being a construction parameter

'ipRouteMask@(new SnmpIpAddress("127.0.0.0"))'

'ifIndex@[ ]'--returns an int array containing the whole table

SNMP Walk Start/Stop Expression

A get-column-element or get-column designator may also include a start expression, a stop expression, or both a start expression and a stop expression. In the grammar:

```
WalkAugment   = "{" [StartExpr] "," [StopExpr] "}"
StartExpr     = Expr ; of type int or String
StopExpr      = Expr ; of type Boolean
```

The value of the start expression can be of type int, or may be an OID value in dotted decimal notation represented by a string. The SNMP table walk starts with that value appended to the base OID value.

A stop expression calculates a Boolean value that indicates whether the SNMP table walk has to be terminated. Each stop expression is evaluated each time one step of the table walk has been made. For example, a stop expression is evaluated when the response to a SNMP get-next request has arrived. Within the stop expression, particular methods can be used to access certain values of the get-next response. These methods are defined in interface SnmpWalkStopperIf of the Developer's API.

An example of a get-column designator with a start and stop expression that denotes all elements with MIB indexes from 3 to 6 is:

'moduleName@{3,intIndex( )[0]>6}[]'

Set/Set-row-element Designatots

Designators also may be used to specify how to write a value into a specific MIB object. A get designator and a get-row designator each have a corresponding set designator, however, no set-next designator is defined. To set a particular value, an object designator is specified on the left hand side of an assignment statement. Examples for set designators include:

```
'sysLocation.0'="room XYZ"

'mcastEnableCgmp.0'=(enable? 1:2) --where enable is some Boolean variable

'moduleAction@[slotNo]'=2

'ipRouteMetric1@(new SnmpIpAddress("127.0.0.0"))'=-1
```

The get-column designator cannot be used as a set designator.

Constructs of the Abstract Device Description Language

The ADD language includes numerous constructs that enable a device developer a means to express structures and functionality necessary to manage a given device. In the preferred embodiment, the ADD is an extension of ASN.1; therefore, the ASN.1 syntax is used, except where specified otherwise. Comments are written in ASN. 1 style, in which two subsequent hyphens denote a comment, terminated either by the end of the current line or by another pair of hyphens. Comments also may be denoted by "(*" and "*)".

Generally, ADD definition constructs follow the following syntactical pattern. A keyword (*-TYPE) identifies the kind of the construct, followed by a list of zero or more clauses. IEach clause is indicated by a keyword. Clauses are ordered as specified in this document. The symbol "::=" (which can be read as "is defined as") leads the right-hand side of an ADD construct. For example, according to the grammar:

```
Header WHAT-TYPE
( Clauses )*
"::=" RightHandSide
```

A trailing comma may appear after the last list element and is ignored by the compiler:

```
List=Element ("," Element )* [","]
```

However, in this document, grammar rules that include such lists do not reflect this option, for the sake of clarity.

The following grammar rules apply to the remainder of the grammar:

```
JavaStatements        = "{" ( JavaBlockStatement )* "}"
JavaBlockStatement    = . . .     ; Java Block Statement
BracedJavaExpr        = "{" JavaExpression "}"
JavaExpression        = . . .     ; Java Expression
```

Since there are several places in the ADD syntax where Java code can be specified, the ADD terminology distinguishes among several kinds of code. "Custom Code" consists of an extended Java syntax which the ADD compiler will translate into corresponding pure Java. For example, object designators comprise Custom Code. "Native Code" is defined with the native clause described below; it passed unchanged by the compiler into the generated Java source code. "Native Java Class Code" is written in regular Java source files stored in the device package directory.

Within Custom Code, a new operator IN is defined in order to make it more convenient to specify a test whether an integer value lies in a set of values. For example, the expression

```
(i == 1) || ((i >= 5) && (i <= 10)) || (i == 20)
can be written more concisely as
i IN {1, 5 . . . 10, 20}
```

Common Clauses

This section defines several clauses which can appear in different ADD constructs. The clauses in question are factorized out in order to have a more concise part on the actual constructs.

Based-ON Clause

The based-on clause allows the developer to define a type T relative to an already existing type B. The type T is then called a derived type; B is the base type. The derived type will inherit clauses from the base type, depending on the type construct. Each section below identifies which clauses are inherited. A based-on relation can only exist between two types with the same construct.

```
BasedOnClause=BASED-ON Qualident
```

In the example below, the component type "derived" will inherit the subcomponents x and y from base.

```
base COMPONENT-TYPE
::= { x, y }
derived COMPONENT-TYPE
BASED-ON base
::= { z }
```

Image Clause

Using an image clause, the developer can specify the visual representation of a particular component, either as a constant string denoting a GIF or XBM file (without path name), or by giving an expression which evaluates to a string denoting the corresponding file name.

```
ImageClause   = IMAGE StringSpec
StringSpec    = String | BracedJavaExpr
Examples
IMAGE "c5-power.gif"
IMAGE {"ps"+version+".gif"}
```

The specified image resides in the device package's images directory.

Option Clause

Using an option clause, a device description may specify additional options with the corresponding type construct. A single option can be negated by prefixing the identifier with an exclamation mark.

```
OptionClause   = OPTION Option ("," Option)
Option         = ["!"] ( "selectable" | "dragable"
                 | "no-compound" | "compound-only"
                 | "auto-refresh"
                 | "abstract"
                 | "delta-monitoring"
                 )
```

For example, an option may be defined for components in a chassis view. The components may be defined as selectable, which indicates that at runtime, the user of the network management system can select the corresponding component in the chassis view. The components may be defined as "dragable," which means that the user is allowed to drag that component and drop it onto a corresponding element within a dialog.

The options no-compound and compound-only are applicable in group type definitions and property type definitions and they define whether that particular group or property is supposed to be displayed in a compound dialog only, a regular dialog only, or both. An auto-refresh option is applicable in dialog type definitions, only. A dialog set to this option will refresh at the same rate a monitor dialog does. An abstract option is applicable with the native type construct, only. A delta-monitoring option is applicable with the property type construct being used in a monitoring dialog context, only.

If a component type or slot type is set to selectable and there is no kind association defined with that type, the compiler will issue a warning. The warning indicates that a component of this type can not be selected in conjunction with any other component; Only components with the same non-empty kind can be selected together.

Device Context Clause

To change a default device context of a component or dialog to a new device context, a device description can specify a source language expression with the device context clause. The expression must evaluate to an object of a pre-defined class. In one embodiment, the pre-defined class is "com.cisco.nm.cvw.ucl.DeviceContext." Methods for calculating new device contexts relative to the existing device context may be provided in pre-defined form.

```
ContextClause=CONTEXT BracedJavaExpr
```

In the following example, the component will use a new device context pointing to a particular device having a host name that has been passed as a construction parameter to the component.

```
comp(host String) COMPONENT-TYPE
CONTEXT {newSession(host)}
::= { . . . }
```

A device context of a component or dialog is propagated down to sub-components or elements.

Menu, Config and Monitor Clause

To associate a component with a particular UI definition, a menu clause, config clause or monitor clause is used. Within each such clause, the name of the desired definition is specified, followed by construction arguments matching the construction parameter list of the definition.

```
MenuClause      = MENU DefRef
ConfigClause    = CONFIG DefRef
MonitorClause   = MONITOR DefRef
DefRef          = Qualident ["(" Arguments ")"]
```

A particular UI clause can refer only to a definition with a matching construct. For example, with a menu clause, only a menu type definition can be referenced.

```
MENU        ThatMenu
CONFIG      PortXyzCfg(portNo)
MONITOR     SomePortCfg(portNo,IfIdx)
NATIVE CLAUSE
```

The native clause can be used to define arbitrary source language declarations, such as variable or method declarations. Within a native clause, object designators may not be specified. If device values are needed, they are passed as parameters into a natively defined method.

```
NativeClause                 = NATIVE JavaDeclarations
JavaDeclarations             = "{" JavaClassBodyDeclarations "}"
JavaClassBodyDeclarations    = . . .     ; Java Class Body Declarations
```

The following example shows how to use a native clause in conjunction with attribute definitions. The string representation of the result of a SNMP get-next on moduleSwVersion.0 is stored in attribute moduleSwVersion. During initialization of moduleSwHiVersion, the native method parseSwVersion( ) is used to parse that string and return the portion in front of the first dot as an integer value. As a side effect, the (zero-initialized) attribute moduleSwLoVersion gets the portion behind the first dot as integer value.

```
ATTRIBUTE
    moduleSwVersion       = { `moduleSwVersion.0@+`.stringVal() },
    String
    moduleSwLoVersion     = { 0 },
    int
    moduleSwHiVersion     = { parseSwVersions(moduleSwVersion) }
    int
```

```
NATIVE{
    int parseSwVersions(String s){
    char c;
    int len = s.length(), i = 0, hv = 0;
    while (i < len){
      if (!Character.isDigit(c = s.charAt(i++))){
        while (i < len){
          if (Character.isDigit(c = s.charAt(i++))){
            int lv = c-'0';
            while (i < len && Character.isDigit(c = .charAt(i++))){
              lv = 10*lv + c-'0';
            }
            moduleSwLoVersion = lv;
            break;
          }
        }
        break;
      }
```

-continued

```
        hv = 10*hv + c - '0';
      }
      return hv;
    }
}
```

On-drop Clause

Several constructs in the ADD language relate to definition of a graphical user interface (GUI) to be used by the network management system when a user is working with a particular device. A GUI definition may be associated with each device. Each GUI definition may have an on-drop clause, which specifies one or more source code statements that are executed when the user performs the "drop" of a drag-and-drop operation. Within the on-drop code, all information regarding the dropped objects can be accessed by using the name dndlnfo as a reference to an object which implements the interface Dndlnfolf.

On-display Clause

The device type construct, component type construct, variant type construct, and group type construct can have an on-display clause. Each on-display clause allows the developer to specify one or more source code statements that are executed immediately before the corresponding object is displayed to the user. For example, an on-display clause can be used to specify statements that are executed before a containment tree is drawn into a chassis view area that is generated by the network management system. Alternatively, an on-display clause can be used to specify statements that are executed before the corresponding dialog category gets displayed to the user.

Add Modules

An ADD module is a module prepared in ASM.1 syntax, containing an import section followed by a definition section. ADD definitions are set forth or stored in the definition section. The name of the module is a valid identifier in the underlying source language, such as Java. A module is stored in a file having the same name as the module and the extension add. Each ADD file contains one module. Each item defined within a module is exportable to another module. In the grammar:

```
Module = Identifier DEFINITIONS "::=" BEGIN
    [ IMPORTS ( Import )+ ";" ]
    ( Definition )*
    END
```

For example, an empty module would be defined as follows:

```
SomeModule DEFINITIONS ::= BEGIN
END -- end of module
```

Import Constructs

One or more import constructs may be used to specify one or more external items, such as a MIB object defined in a MIB module, that an ADD module will use. An ADD module may specify the name of the other module, without listing the items to be imported. Items of the other module may be specified by prefixing the item name with the module's name followed by a period ("qualified identifier"). Thus, in the grammar:

```
Qualident=[Identifier "."] Identifier
```

Module names may be long. To make references to external items more convenient, a module may be given an alias. The alias is used in qualified identifiers instead of the module's full name. In addition, the import construct allows Java classes to be imported.

```
Import            = Identifier ("," Identifier )* FROM ModuleIdentifier
                  | [ Identifier "::=" ] ModuleIdentifier
                  | "{" Identifier ("." Identifier)* ["." "*"] "}"
ModuleIdentifier  = [JavaIdentifier "."] JavaIdentifier
                  | <UCNAME>
```

A module name may have a qualifier as a prefix, in which the qualifier names the device package in which the module may be found. Each Java class that is imported using an ADD import construct is stored in the import section of every class generated for that ADD module.

The following example shows the three different ways of importing and referencing an external item:

```
SomeModule DEFINITIONS ::= BEGIN
IMPORT a,b,c FROM SomeOtherModule
    ModuleX
    M ::= ModuleY
    {java.lang.Hashtable};
    . . . a . . .            -- unqualified reference to item a
    . . . ModuleX.d . . .    -- qualified reference to item d exported from
                                ModuleX
    . . . M.e . . .          -- aliased qualified reference to item e exported
                                from ModuleY
    . . . Hashtable . . .    -- within native code
END -- end of module
```

A lookup mechanism for locating an ADD source file for a particular import definition works as follows. With an unqualified import definition, only the same device package directory is searched for the corresponding ADD source file. With a qualified import definition, the qualification identifier denotes the device package directory that is searched for the corresponding ADD source file. A MIB module is imported with an unqualified import definition. In response, the corresponding MIB source file is located according to the definitions in the MIBPATH, and the MIB map files, if any.

Containment Hierarachy

A containment hierarchy is a tree representing physical or logical entities of a device. For example, a particular network device may contain one or more cards, each card may contain one or more ports, and there may be other subordinate structures. A containment tree is a data structure that logically represents the physical or logical elements of a real-world network device. Each containment tree comprises one or more components. The root node of the tree is a special component called the device component.

Device Types

The device type construct defines a device component that represents the root of a containment hierarchy. In the OID clause, indicated by the keyword OID, at least one sysObjectID value is specified, to define the real devices to which the current definition applies. Each OID value can be suffixed by ".*", in which case the corresponding device type definition applies to all devices having a matching sysObjectID value. The OID clause can be augmented by a mapping condition, which specifies further restrictions to the applicability of the definition. Within the condition, an identifier oid may refer to the physical device's sysObjectID. Thus, in the grammar:

```
DeviceDef    = Identifier DEVICE-TYPE
               OidSpec
               [ CONTEXT      DeviceContext     ]
               [ ATTRIBUTE    Attributes        ]
               [ TOOLBAR      DefRef            ]
               [ MENU         DefRef            ]
               [ CONFIG       DefRef            ]
               [ MONITOR      DefRef            ]
               [ NAME         NativeCode        ]
               [ ON-DISPLAY   BracedJavaBlock   ]
               (View)+
               "::=" Subcomponents
OidSpec      = OID Oid ("," Oid )* [Condition]
Oid          = Qualident ("." Unsigned)* [".*"]
               | Unsigned ("." Unsigned)* [".*"]
               | "{" Qualident (Unsigned)* "}"
```

Like the menu clause, a menu type can be referenced with a toolbar clause. In response, the network management system will display the corresponding menu in the application wide menu area, for example, in the toolbar.

The attribute clause allows additional attributes to be declared as acting as instance variables within a device component at run-time. Attributes can be referenced within OID conditions.

A device may have one or more "faces" or views that the user can choose to display when the user is displaying the device's chassis with the network management system. Therefore, the developer may specify at least one view, using the keyword VIEW. When a device is opened using the network management system, the last defined view is shown in the chassis display. A view is defined as:

```
View          = VIEW Label [Alias [Help Tag]] [Condition]
                IMAGE StringSpec
                [ "{" ViewCompRef"}" ]
ViewCompRef   =      "*" | SubcompRef("," SubcompRef)*
SubcompRef    = Label ["*"]
```

If an alias for a view is specified, then the alias string is displayed in the user interface of the network management system to identify the view. The optional help tag points to the help text belonging to the view.

The optional condition is evaluated at construction time. If it evaluates to false, the corresponding view will not appear in the list of views.

The image clause specifies the file name of an image of the device chassis to be shown in the chassis display. It is followed by a list of sub-component references that denote the components which are shown in that view. A sub-component reference r denotes either a sub-component with the label r, or all subcomponents with the type r; A subcomponent reference r* denotes all subcomponents with a label starting with r, and/or all subcomponents of a type with a name starting with r.

If a view will show all a device's components, then an asterisk can be used as an abbreviation. This character can also be used as a suffix for a label, in which case it represents all sub-components with a matching name.

The following example defines a device component applicable for devices yielding the value wsc5000sysID when requesting the MIB object sysObjectID.0. It has two views. Only the rear view shows further subcomponents, which are two components representing power supplies of the device, and five components representing the cards plugged into the device.

```
C5K DEFINITIONS ::= BEGIN
IMPORTS wsc5000sysID FROM CISCO-STACK-MIB;
    C5000 DEVICE-TYPE
    OID   wsc5000sysID
    VIEW front IMAGE "c5-f.gif"
    VIEW rear IMAGE "c5-r.gif" {*}
    ::= {   AT (91,31)    C5kPs,
            AT (414,32)   C5kPs,
            AT (65,166)   Wsx5XXX,
            AT (65,220)   Wsx5XXX,
            AT (65,272)   Wsx5XXX,
            AT (65,325)   Wsx5XXX,
            AT (65,378)   Wsx5XXX
        }
END
```

The following example demonstrates the usage of a mapping condition.

```
. . .
OldC5000 DEVICE-TYPE
OID wsc5000sysID { swHiVers < 2 }?
ATTRIBUTE
    swVers String    = { `moduleSwVersion.0+`.stringVal() },
    swHiVers int     = { Integer
                          .parseInt(swVers.substring
                          (0,swVers.indexOf('.')))
                       }
::= . . .
```

A device component of type OldC5000 is applicable only if the high part of the software version number of the first plugged-in module is less than 2. The OID condition references the attribute swHiVers, which is assigned a value at construction time from the expression that extracts the high part from the software version string stored in the attribute swVers. That attribute received its value from the SNMP designator denoting a get-next request on moduleSwVersion.0.

Components Types

The component type construct is the central mechanism for specifying the nodes of a containment hierarchy. It is used to specify static containment relations; dynamic containment relations are modeled by using the slot type construct. After the name of the component type, one or more construction or evaluation parameters may be specified, followed by the keyword COMPONENT-TYPE. An optional parenthesized identifier behind the keyword is a component tag that represents the kind of component; it indicates that components of that type belong to a particular class of components. For example, a component tag may be chassis, backplane, container, powerSupply, fan, sensor, module, port, or another element that is defined in the physicalClass of the entity's MIB. For artificial components that do not have a physical or logical counterpart in the real device, the component tag can be omitted. Only components of the same kind can be selected together by the user. In the grammar:

```
ComponentType = Identifier [ConstructionPars] [EvaluationPars]
COMPONENT-TYPE
    ["(" Identifier ")"]
    [ BASED-ON      Qualident          ]
    [ IMAGE         StringSpec         ]
    [ OPTION        Options            ]
    [ CONTEXT       DeviceContext      ]
    [ ATTRIBUTE     Attributes         ]
    [ MENU          DefRef             ]
    [ CONFIG        DefRef             ]
    [ MONITOR       DefRef             ]
    [ POLL          BracedJavaBlock    ]
    [ NATIVE        JavaDeclarations   ]
    [ ON-DISPLAY    BracedJavaBlock    ]
    "::=" ( Subcomponents | VisualRef)
```

The poll clause is unique to the component type construct. The code specified using a poll clause is executed at the end of each polling cycle, after regular polling evaluations have been executed. Generally, the poll clause is used to make manipulations to a custom visual, as described below, that is defined on the right-hand side of the definition.

The structure of the right-hand side of a component type construct may have one of two forms, depending on the intended place of the component within the containment tree. If the component contains further sub-components, then references to their types are enumerated. An iterator may be used if there are many sub-components. If the component is a leaf node, the developer specifies a reference to a visual that defines how to visualize a value within the chassis view. In the grammar:

```
Subcomponents           = "{"
                          [ SubcomponentOrIterator ("," SubcomponentOrIterator)* ]
                          "}"
SubcomponentOrIterator  = Subcomponent | SubcomponentIterator
Subcomponent            = [Label] [Position] Qualident
                          [ConstructionArgs] [EvaluationArgs]
Position                = AT "(" Expr "," Expr ")"
```

The expressions following the keyword AT may comprise one or more constants and references to construction parameters. They denote the position of the image relative to the parent component's image. If they are omitted, a position of (0,0) is used.

Two different visual references may be used. A first visual reference is used by specifying the name of a defined visual type followed by an evaluation expression, which evaluates to an integer. The second visual reference is used by the keyword CUSTOM, followed by an expression calculates an object of typejava.awt.Component.

```
VisualRef = Qualident "{" Expr "}"
          | CUSTOM "(" Expr ")"
```

Use of braces with regular visuals, as opposed to parentheses that are used for custom visuals, indicates that for regular visuals the expression is evaluated at evaluation time (polling time), whereas for custom visuals, the expression is evaluated at construction time.

The following example defines a non-leaf component for representing a power supply containing one LED that is displayed at a fixed position relative to the origin of the specified image.

```
C5kPs(psNo INTEGER) COMPONENT-TYPE(power)
IMAGE "c5-power.gif"
OPTION selectable
::= { AT (180,60) PsLed{'chassisPs${psNo}Status.0'.intVal( )} }
PsLed(status INTEGER) COMPONENT-TYPE
::= LedStatus{status}
```

Slot Types

A regular component type is used to express static relations among components. A slot type defines a dynamic relation that is established at run-time according to particular values that are received from the actual network device. The grammar definition is:

```
SlotType            = Identifier [ConstructionPars] [EvaluationPars] SLOT-TYPE
                      ["(" Identifier ")"]
                      [ BASED-ON    Qualident         ]
                      [ IMAGE       StringSpec        ]
                      [ OPTION      Options           ]
                      [ CONTEXT     DeviceContext     ]
                      [ ATTRIBUTE   Attributes        ]
                      [ NATIVE      JavaDeclarations  ]
                      "::=" CondSubcomponents
CondSubcomponents   = "{" CondSubcomp ("," CondSubcomp)* "}"
CondSubcomp         = Condition Subcomponent
```

The semantics of the available clauses matches those of the component type construct. However, in the right side of a slot type construct, every specified sub-component must be prefixed with a condition. Each condition is an expression of any form, written in a standard source language, such as Java®. At run time, only one sub-component is constructed, based on the result of evaluating the expression. Specifically, only that sub-component is constructed for which a condition evaluates to true. The following type definitions illustrate the usage of a slot type construct.

```
C5000 DEVICE-TYPE ...
::= { Wsx5XXX(1),
      Wsx5XXX(2),
      Wsx5XXX(3),
      Wsx5XXX(4),
      Wsx5XXX(5)
    }
Wsx5XXX(slotNo INTEGER) SLOT-TYPE(module)
ATTRIBUTE mt INTEGER = { 'moduleType,slotNo'.intVal( ) }
::= { {mt == 23}?   Wsx5009,
      {mt == 26}?   Wsx5010,
      {mt == 36}?   Wsx5213,
```

-continued

```
      {mt == 56}?   Wsx5203,
      {mt == 40}?   Wsx5509,
      {mt == 45}?   Wsx5158,
      {mt == 37}?   Wsx5020,
      {true}?       WsxUnknown,
    }
Wsx5009 COMPONENT-TYPE ...
Wsx5010 COMPONENT-TYPE ...
Wsx5213 COMPONENT-TYPE ...
...
```

In this example, the device component C5000 represents a model 5000 device of Cisco Systems, Inc. Model 5000 has five sub-components of type Wsx5XXX. Each sub-component represents one physical module slot of the device. Using the construction parameter slotNo, the slot number of each sub-component is passed down from the device component at construction time. To calculate a value for the attribute mt, the value of slotNo is used in the object designator to request the corresponding instance of the MIB object moduleType, which yields the type of the module. If there is no such instance, then construction of a component with type Wsx5XXX would fail. As a result, the corresponding slot in the chassis remains empty.

Variant Types

A variant type is similar to a regular component type, and has a given number of sub-components. However, a variant type also differs from a component type. For example, only one sub-component of the variant type is displayed in the chassis at a time. Syntactically, a variant type is simpler than a component type. No additional clauses are used with the variant type. Necessary functionality, such as attributes or native code, is located with the parent of a variant. Position definitions (AT clauses) are not used with subcomponent definitions of the variant type.

```
VariantType          = Identifier [ConstructionPars] [EvaluationPars] VARIANT-TYPE
                       [ ON-DISPLAY BracedJavaBlock ]
                       "::=" VariantSubcomponents
VariantSubcomponents = "{" [ VariantSubcomponent ("," VariantSubcomponent)* ] "}"
VariantSubcomponent  = [Label] Qualident [ConstructionArgs] [EvaluationArgs]
Example for a variant type definition:
Var VARIANT-TYPE
::= { label1 SubComponent1,
      label2 SubComponent2
    }
```

MIB Object Extensions

The constructs presented in this section are closely related to MIB objects and therefore they are called MIB object extensions.

Visual Types

A visual type is used to add visual information, such as a color or an image, to each element in an integer enumerated series. As a result, a given integer value can be displayed visually in the chassis view of the network management system. Thus, a visual type maps an integer value to something visible. The grammar definition is:

```
VisualDef          = Identifier VISUAL-TYPE
                     [ BASED-ON Qualident        ]
                     [ DEFAULT VisualDefaultItem ]
                     "::=" "{" VisualItem ("," VisualItem )* "}"
VisualDefaultItem  = Signed | VisualValue | Identifier
VisualItem         = ( Identifier ["(" Signed ")"] | Signed ) VisualValue
VisualValue        = String | NativeCode
                     | ( Identifier "." Identifier ["." Identifier]
                     | <UCNAME> "." Identifier "." Identifier
                     )
```

Visual types comprise an image visual type and a color visual type. An image visual type identifies file names of images. A color visual type identifies colors that are used when a particular integer value is displayed in the in chassis view. Within a single visual type, one target type, such as color specifications or image specifications, must be used consistently.

As an example, assume there is an ADD module CVW_DEFAULTS defined as:

```
CVW_DEFAULTS DEFINITIONS ::= BEGIN
    StatusColor VISUAL-TYPE
    DEFAULT off
    ::= { fail(1)        {java.awt.Color.red},
          down(2)        {java.awt.Color.orange},
          dormant(3)     {java.awt.Color.cyan},
          minor(4)       {java.awt.Color.yellow},
          up(5)          {java.awt.Color.green},
          testing(6)     {java.awt.Color.magenta},
          off(-1)        {java.awt.Color.black}
        }
END
```

Then, the definitions below give examples for an image visual type definition and for a color visual type definition:

```
M DEFINITIONS ::= BEGIN
IMPORTS CVW_DEFAULTS;
    PortStatus VISUAL-TYPE
    ::= { 1 "sc1.gif",
          2 "sc2.gif",
          3 "sc3.gif",
          4 "sc4.gif" }
    LedStatus VISUAL-TYPE
    ::= { 2 CVW_DEFAULTS.StatusColor.up,
          3 {java.awt.Color.yellow},
          4 CVW_DEFAULTS.StatusColor.fail }
END
```

Further, a visual type can be defined relative to another visual type, so that labels denoting enumeration elements of the base type can be used instead of integer number literals. Such a relation is specified using the BASED-ON clause by referencing the name of the other visual type, as shown in the example below.

```
SomeAdd DEFINITIONS ::= BEGIN
IMPORTS CVW_DEFAULTS;
    PortStatus VISUAL-TYPE
    BASED-ON CVW_DEFAULTS.StatusColor
    DEFAULT ok
    ::= { minor            {java.awt.darkGray},
          majorFault(7)    StatusColor.fail
        }
END
```

This example shows use of a default clause to define visual information to be dispalyed, if the visual type is applied to an integer value not specified in the enumeration. This default behavior is defined by specifying either an integer number literal, a label existing in the enumeration or by specifying the visual target (color or image), within the default clause.

Property Types

A property type specifies functions carried out in configuration and monitoring dialogs of the network management system. A property type defines exactly one data type, called the property kind, that identifies how to calculate a value of that data type when reading from a device, and what to do when a value of that data type is written to the device. A property type is closely related to a MIB object. For each accessible MIB object, a property type is defined implicitly, and can be used without defining it explicitly by referring to the imported MIB object. An explicit property type is defined only if an implicit property type is not sufficient.

As stated in the following grammar rules, with an explicit property type, a property kind is specified on the right side of the construct. A property kind may be denoted by a single identifier, or by one of two enumerated property kinds. If neither choice nor radio is specified as the property kind, the enumerated kind defaults to choice.

```
PropertyType   = Identifier [ConstructionPars] PROPERTY-TYPE
                 [    BASED-ON     Qualident         ]
                 [    DESCR        StringSpec        ]
                 [    ALIAS        StringSpec        ]
                 [    OPTION       Options           ]
                 [    CONTEXT      DeviceContext     ]
                 [    ATTRIBUTE    Attributes        ]
                 [    INDEX        Identifier        ]
                 [    UNITS        String            ]
                 [    MIN          BracedJavaExpr
                   [  WARNING      BracedJavaExpr    ]
                   [  ALERT        BracedJavaExpr    ]
                      MAX          BracedJavaExpr
                 ]
                 [    NATIVE       NativeCode        ]
                 [    READ         BracedJavaBlock   ]
                 [    WRITE        BracedJavaBlock   ]
                 [    ACTION       BracedJavaBlock   ]
                 [    ON-DROP      BracedJavaBlock   ]
                 "::=" ("{" "}" | PropertyKind )
PropertyKind   = "string" | "ipAddress" | "integer" | "long" | "bigInt" | "float" | "octets"
                 | "checkbox"
                 | ["choice"|"radio"] "{" EnumItem ("," EnumItem )* "}"
EnumItem       = Identifier | String
```

The DESCR clause defines a short name of a property. The short name may be displayed when the user switches to "Show MIB Label as: Descriptor" in a preferences dialog of the network management system. The string in the DESCR clause can not be overridden at the property reference place.

The ALIAS clause defines a long name of the property. The long name may be displayed when the user switches to "Show MIB Label as: Alias" in the preferences dialog. The string specified with the ALIAS clause can be overridden at the property reference place.

How to calculate a value of a property when the property is read from or written to the device is defined by programming language statements within the read or write clause. References to the property's value can be made by using the implicit attribute "value". The type of the value attribute depends on the property kind, as shown by the following table:

| PROPERTY KIND | TYPE OF VALUE |
|---|---|
| String | java.lang.String |
| Checkbox | Boolean |
| ipAddress | java.lang.String |
| integer | int |
| long | long |
| bigInt | java.math.BigInteger |
| float | float |
| octets | byte[] |
| radio | int |
| choice | int |

In the case of a popup or radio property, the value is in the range from 0 to number of enumeration items −1. The property kinds integer, long, bigInt and float are numerical property kinds. If the write clause is omitted, the property type is read-only. For a MIB object with read-only access, every associated implicit property type also is read-only. If an action clause is specified, the associated code is executed whenever the user has changed the value for that clause. With the units clause, a simple string can be defined which will be used in monitoring dialogs. Only if the property is of kind checkbox, the units string will be used also in configuration dialogs.

The following example defines a property type with which a user of the network management system can enable or disable a network device by checking a checkbox:

```
mcastEnableCgmp(inst INTEGER) PROPERTY-TYPE
READ    { value = ('mcastEnableCgmp,inst'.intVal( ) == 1); }
WRITE   { 'mcastEnableCgmp,inst' = (value? 1 : 2); }
::= checkbox
```

The following example shows use of an implicit property type of kind popup.

```
portAdminSpeed(slotNo INTEGER, portNo INTEGER) PROPERTY-TYPE
NATIVE    { final static int values[] = {1,10000000,100000000,155000000}; }
READ      { switch ('portAdminSpeed,slotNo,portNo'.intVal( )){
            case 10000000   : value = 1; break;
            case 100000000  : value = 2; break;
            case 155000000  : value = 3; break;
            default         : value = 0;
            }
          }
WRITE     { 'portAdminSpeed,slotNo,portNo' = values[value]; }
::= radio("Auto Detect","10 Mbps","100 Mbps","155 Mbps")
```

Property Value Classifier

For numerical property kinds, the property type construct can define a classification of the property's value using the MIN, MAX, WARNING and ALERT clauses. Each clause may specify a programming language expression that calculates a value of a type corresponding to the property's kind, or that equals the type of the property's value implicit attribute. Since each value may represent additional information for the network management system, it is called a value classifier. An example of a value classifier is information how to draw a chart in a monitoring dialog that is generated by the network management system.

For implicit and derived property types, values for MIN and MAX are derived from the MIB object's syntax where applicable. With an explicit property, the MIN and MAX clauses are always defined together. A property type having a WARNING and/or ALERT clause must also have a MIN and MAX clause. Assuming an interval of [min,max], the warning and alert intervals are calculated according to the following table:

| Clause | Warning Interval | Alert Interval |
|---|---|---|
| WARNING w (only) | [w,max] | ]max,max[ |
| ALERT a (only) | ]a,a[ | [a,max[ |
| WARNING w<br>ALERT a | [w,a[ | [a,max] |

A property type referenced in a monitoring context by a chart of type dial must define MIN and MAX.

Indexed Property Types

An index clause indicates that a property type is an indexed property type. A property of such type is usually used as a table column. Within the read and write code, an identifier specified with the index clause may refer to the visual row number of the column element currently processed. For example:

```
sysTrapReceiverCommProp PROPERTY-TYPE
INDEX i
READ { value = 'sysTrapReceiverComm@[i]'.stringVal( ); }
WRITE { 'sysTrapReceiverComm@[i]' = value; }
::= string
```

Derived Property Types

An explicit property type may be defined relative to a MIB object using the based-on clause, in which case the property type is called a derived property type. A derived property type is defined with the empty property kind, written as "{ }" on the type construct's right-hand side. If a property type P is derived from a MIB object M, the following statements are applied. If M has an associated units clause, P will inherit this clause, unless P overrides it by giving an explicit UNITS clause. The kind of P gets derived from the syntax of M according to the following table:

| Syntax | Kind |
|---|---|
| DisplayString | string |
| INTEGER{...} | choice |
| IpAddress | ipAddress |
| INTEGER, Integer32 | integer |
| Unsigned32, Gauge, Gauge32, TimeTicks, Counter, Counter32 | long |
| Counter64 | bigInt |
| OCTET STRING | octets |

If M's syntax does not fall into one of the syntaxes shown above, the compiler generates an error. If the kind of P has been derived to choice, additional code is generated with P, equivalent to the following native clause:

```
NATIVE{public int[ ]_values=new int[ ]{enum1, enum2, enum3, . . . };}
```

where $enum_i$ denotes the $i^{th}$ enumeration value of M. Additionally, a lookup method is used to lookup a particular enumeration constant in the _values array.

If P does not have a read clause, a read clause gets generated depending on P's kind according to the following schema:

| Kind | Read Code |
|---|---|
| string, ipAddress | value = 'P,$q_1$,$q_2$,$q_3$,...'.stringVal( ); |
| choice | value = h$lookup(_values,'P,$q_1$,$q_2$,$q_3$,...'.intVal( )); |
| integer | value = 'P,$q_1$,$q_2$,$q_3$,...'.intVal( ); |
| long | value = 'P,$q_1$,$q_2$,$q_3$,...'.longVal( ); |
| bigInt | value = 'P,$q_1$,$q_2$,$q_3$,...'.bigIntVal( ); |
| octets | value = 'P,$q_1$,$q_2$,$q_3$,...'.octetVal( ); |

where $q_i$ denotes the $i^{th}$ construction parameter defined with P. If P does not have a write clause and if M has no write access (read-write or write-only), a write clause gets generated depending on P's kind according to the following schema:

| Kind | Write Code |
|---|---|
| string, integer, long, octets, bigInt | 'P,$q_1$,$q_2$,$q_3$,...' = value; |
| ipAddress | 'P,$q_1$,$q_2$,$q_3$,...' = new SnmpIpAddress(value) |
| choice | 'P,$q_1$,$q_2$,$q_3$,...' = _values[value]; |

where $q_i$ denotes the $i^{th}$ construction parameter defined with P and SnmpIpAddress is imported from an external package.

To define P as read-only, although M is defined with read-write access, a write clause is defined with P containing no statements, i.e. "WRITE{ }". If P has an index clause defining an index identifier idx, the object designator within a generated read or write clause takes the form: 'P,$q_1$,$q_2$,$q_3$, . . . @[idx]'

Implicit Property Types

A configuration dialog definition may refer to a MIB object without defining a property type explicitly. Depending on that reference and on the syntax of the MIB object, a corresponding implicit property type will be created at run-time and used. For example, a reference like moduleName(slotNo) makes use of an implicit property type, whose explicit equivalent could be written like:

```
moduleName(inst INTEGER) PROPERTY-TYPE
READ { value = 'moduleName,inst'.stringVal( ); }
WRITE { 'moduleName,inst' = value; }
::= string
```

If the MIB object is read-only, the corresponding implicit property type will not have a write clause. The value of a units clause for an implicit property type is taken from the MIB object's units clause, if there is one. Generally, for any property reference there is an implicit property type whose construction parameter section matches the construction arguments of the reference, while the property kind corresponds to the MIB object's syntax as shown in the following table:

| MIB Object's Syntax | Property Kind |
|---|---|
| INTEGER { ... } (enumerated integer) | Popup |
| INTEGER, Integer32 | integer |
| Unsigned32, Gauge, Gauge32, TimeTicks, Counter, Counter32 | long |
| Counter | bigInt |
| OCTET STRING | octets |
| IpAddress | ipAddress |
| Other | string |

User Interface Definitions

User interface definitions provide a mechanism for defining a portion of the content or structure of the user interface that is generated by the network management system for a particular network device that is associated with the user interface definitions. For example, user interface definitions may define what is shown in the UI but not how it is to displayed. Generally, user interface definitions may be used to define functional glue between UI elements. A user interface definition applies to all components of a specific type since each user interface definition is always associated with a component type definition.

Menu Types

A menu type may define a context menu that is referenced by a menu clause of a component type. The menu will be used in the chassis view that is generated by the network management system for each component instance of that type. A menu consists of items. A menu item can include a construction condition and must have either an alias defining menu text, or an image clause defining an image to be displayed, or both. Optionally, an item can have a label to be used as a reference to that particular item from within programming language source code.

A menu can be defined with the menu type construct as follows:

```
MenuType    = Identifier [ConstructionPars] MENU-TYPE
              [ BASED-ON    Qualident       ]
              [ CONTEXT     DeviceContext   ]
              [ ATTRIBUTE   Attributes      ]
              [ NATIVE      NativeCode      ]
              "::=" MenuItems
MenuItems   = "{" [ MenuItem ( "," MenuItem )* ] "}"
MenuItem    = SEPARATOR
            | [DEFAULT] [Condition] [Label] [Alias] [IMAGE StringSpec]
              BracedJavaBlock
            | Submenu
```

An item comprising only the keyword SEPARATOR will cause the network management system to generate a separator line in the menu. A menu item that is tagged with the keyword DEFAULT is the menu's default item. If a menu is associated with a component type, and that component type does not have a configuration dialog, then the code of the default item will be executed when the user double-clicks the component's image in the chassis view.

In addition, menus can be nested. There are two ways to define an inner menu, by either specifying the inner menu items "in-line", or by referring to another menu type:

```
Submenu = [Condition] MENU [Label] [Alias] [IMAGE StringSpec] MenuItems
        | [Condition] MENU [Label] [Alias] [IMAGE StringSpec] DefRef
```

An example for a simple device menu is:

```
DevMenu MENU-TYPE
NATIVE
  { void resetDevice( ){ /* whatever's necessary to reset the device */ }
    void clearDevice( ){ /* whatever's necessary to clear the device */ }
    boolean fancyFeatureAvailable( ){
        return /* whatever's necessary to detect the fancy feature */;
    }
    void applyFancyFeature( ){/* whatever's necessary to apply the feature */ }
  }
::= {                           "Reset"                { resetDevice( ); },
                                "Clear All Counters"   { clearDevice( ); },
  {fancyFeatureAvailable( )}?   "Fancy Feature"        { applyFancyFeature( ) }
}
```

If a menu type D is based on another menu type B, the resulting menu will consist of B items followed by D items as long as D items have different aliases. A D item with the same alias as a B item will override the B item and will be displayed at the position of B item.

Configuration Dialog Types

A configuration dialog type defines a set of properties structured into categories, groups and tables that may be manipulated by a user or a client application. A configuration dialog type also defines functions executable in response to a request of a user or client. In the context of a network management system, these structures are mapped to GUI objects that are accessible by the user. Dialogs are grouped into categories at the first structuring level. The content of a category is a group of elements. An element is a node that is a part of a configuration dialog. A configuration dialog can be specified by using the dialog type construct:

```
DialogType = Identifier [ConstructionPars] DIALOG-TYPE
             [ BASED-ON    Qualident      ]
             [ TITLE       StringSpec     ]
             [ OPTION      Options        ]
             [ CONTEXT     DeviceContext  ]
             [ ATTRIBUTE   Attributes     ]
             [ NATIVE      NativeCode     ]
             "::=" "{" [ Category ( "," Category )* ] "}"
```

The title clause defines a title for a dialog that is displayed in the title area of the corresponding window. The title can be defined by specifying either a string, or an expression with a string result.

In the preferred embodiment, there are four different kinds of category definitions.

First, a separator indicates that the network management system user interface should draw a separator line when displaying a list of categories. A separator line may be used to indicate that two subsequent categories do not belong together closely. A group that defines the category's elements can be defined by referring to a group type, or by specifying the group "in-line." All labels defined with a category's "in-lined" group are only visible within the same category. An action category defines one or more statements in a programming language that are executed when the user chooses the category while preventing the actual dialog from changing the currently displayed category. A custom category defines a component object as a category's content.

```
Category = SEPARATOR
         | [Condition] [Label] Alias [HelpTag]
           ( GroupRef
           | [BUTTONS Buttons] "{" [ Element ("," Element)* ] "}"
           | ACTION NativeCode
           | CUSTOM BracedJavaExpr ; must return a java.awt.Component object
           )
GroupRef = Qualident [ConstructionArgs]
```

A non-separator category definition may include a construction condition that defines when the corresponding category is displayed in the category list.

Using the based-on clause, the dialog type extension mechanism may operate with categories. For example, if a dialog type D is based on another dialog type B, the resulting dialog will consist of B categories followed by D categories, as long as D categories have different aliases. A D category with the same alias as a B category will override the B category, and is displayed at the B category's position. The buttons clause allows to override the set of standard buttons for a particular category.

An example of a dialog type definition for a device component, including a definition for the first category, comprises the following ADD fragment:

```
DevDlg DIALOG-TYPE
NATIVE
  {
    Boolean isBridge( ){
        return /* whatever's necessary to say that the device is a bridge */;
    }
  }
::= { "Management" {
    [ s={ sysName sysContact sysLocation sysIpAddr sysNetMask sysBroadcast
          sysIpVlan sysMgmtType sysArpAgingTime sysEnableRedirects
          snmpEnableAuthenTraps sysEnableChassisTraps sysEnableChassisTraps
          sysEnableModuleTraps sysEnableBridgeTraps sysEnableRmon
          sysCommunityRo sysCommunityRw sysCommunityRwa sysConfigChangeTime
          sysEnableRepeaterTraps mcastEnableCgmp}
    : s(0)]
  },
```

-continued

```
    "Trap Receivers"                          { ... },
    "Physical"                                { ... },
    "Switch Port Analyzer"                    { ... },
    SEPARATOR,
    "Cisco Discover Protocol"                 { ... },
    "VLAN & Bridge"                           { ... },
    SEPARATOR,
    "IP Route"                                { ... },
    "ARP Table"                               { ... },
    "TCP"                                     { ... },
    "TCP Connections"                         { ... },
    "UDP"                                     { ... },
    {isBridge( )}? "FDDI/Ethernet Bridge"     { ... }
}
```

Groups and Group Types

Using the group construct, a device description can structure elements of a dialog. Also, the device description may influence the format of a dialog. Since a group can be defined with a named group type construct, common groups of elements can be factorized out. If a device description includes an alias in a group construct, it will show up in the dialog as a title of the enclosed elements. The elements will then be surrounded by an appropriate border, as determined by the network management system. In the grammar:

```
Group = (GROUP|VGROUP|HGROUP) [Label] [Alias]
        [ ON-DROP BracedJavaBlock ]
```

Elements

Using the keyword VRGOUP or HGroup, a device description can define a layout of the elements associated with that keyword. A vertical layout policy places the elements from top to bottom. A horizontal policy places elements from left to right. If no layout policy is specified, the policy active in the enclosing group applies. If there is no enclosing group, vertical layout policy is the default.

An element inside a group may reference a defined element type (property or group), a button, a table, a group, or a custom element.

```
Elements     = "{" [ Element ("," Element)* ] "}"
Element      = [Condition] ElementRef
             | [Condition] BUTTON Button [ON-DROP BracedJavaBlock ]
             | [Condition] Table
             | [Condition] Group
             | [Condition] CUSTOM BracedJavaExpr     ; must return a
                                                     ; java.awt.Component object
             | "[" IteratorHeader Element ("," Element)* "]"
ElementRef   = [Label] [Alias] Qualident [ConstructionArgs]
```

Each element that is not as part of an iterator can be prefixed with a construction condition. In that case, the corresponding element is constructed only if the condition evaluates to true. The expression specified with a custom element must calculate a component object. Multiple element definitions can be abbreviated by using an iterator.

In addition to defining a group anonymously within a category, a group type can be given a name by defining it with the group type construct:

```
GroupType = Identifier [ConstructionPars] GROUP-TYPE
            [ BASED-ON      Qualident          ]
            [ CONTEXT       DeviceContext      ]
            [ ATTRIBUTE     Attributes         ]
            [ NATIVE        NativeCode         ]
            [ READ          BracedJavaBlock    ]
            [ WRITE         BracedJavaBlock    ]
            [ ACTION        BracedJavaBlock    ]
            [ ON-DROP       BracedJavaBlock    ]
            [ ON-DISPLAY    BracedJavaBlock    ]
            [ BUTTONS       Buttons            ]
            "::=" Elements
```

Using a read clause or a write clause, the developer can specify statements in a programming language that are executed when the corresponding dialog reads or write values from or to the device. Statements specified with an action clause are executed each time the user changes a value of a property within that group, after execution of the action clauses of the changed property. If a group type T has been assigned standard button definitions by the use of the buttons clause, T can no longer be referenced as an inner group.

Several different elements may be enclosed by a group construct. For example, further subgroups can be defined either anonymously or by referencing a named group type definition. Alternatively, user-triggerable custom code may be anchored within a dialog by specifying buttons; elements for enabling the user to manipulate data of a device are defined either referring to a property type or by specifying a table. In addition, a device description can use iterators for factorizing out common parts of subsequent element definitions. Any other expression may be enclosed in a group construct, provided that the expression returns a component object, which is placed within the group as an element.

```
ElementIterator="[" IteratorHead Element "]"
```

Another example of the use of groups is set forth in the following ADD code. The code defines the layout of a device configuration dialog, and defines a category with a dialog type referencing a name group type. It also uses the group construct to establish a layout for the elements, and an explicit property type is used for the first column of the table. Numeric values that specify screen locations for buttons and other elements have been omitted for clarity.

```
DevCfg DIALOG-TYPE
::=  { ...
       "VLAN & Bridge" VlanAndBridge,
       ...
     }
VlanAndBridge GROUP-TYPE
::=  { HGROUP {
          TABLE {
               "VLAN Number"  VlanNumber, -- ref to explicit property defined below
               "VLAN Name"    vtpVlanName, -- ref to implicit property
               "VLAN Type"    vtpVlanType, -- ref to implicit property
               "VLAN State"   vtpVlanState, -- ref to implicit property
          },
          VGROUP{
               VGROUP "View Ports" {
                    BUTTON "VLAN Members"                { ... },
                    BUTTON "Inter Switch"                { ... },
                    BUTTON "Clear Ports"                 { ... },
                    BUTTON "VLAN Non-Trunk Members"      { ... },
               },
               VGROUP "Bridge" {
                    BUTTON "Configure..."                { ... },
                    BUTTON "Forwarding..."               { ... },
                    BUTTON "Static..."                   { ... },
               },
               VGROUP "VTP-VLAN" {
                    BUTTON "Local Mgmt Domain"           { ... },
                    BUTTON "Create VLAN..."              { ... },
                    BUTTON "Delete VLAN..."              { ... },
                    BUTTON "Modify VLAN..."              { ... },
               },
          }
       }
     }
VlanNumber PROPERTY-TYPE
INDEX i
READ{ value = Integer.toString('vtpVlanName@[i]'.oid( ).getLastSubId( ));}
::= string
```

Figure 7:
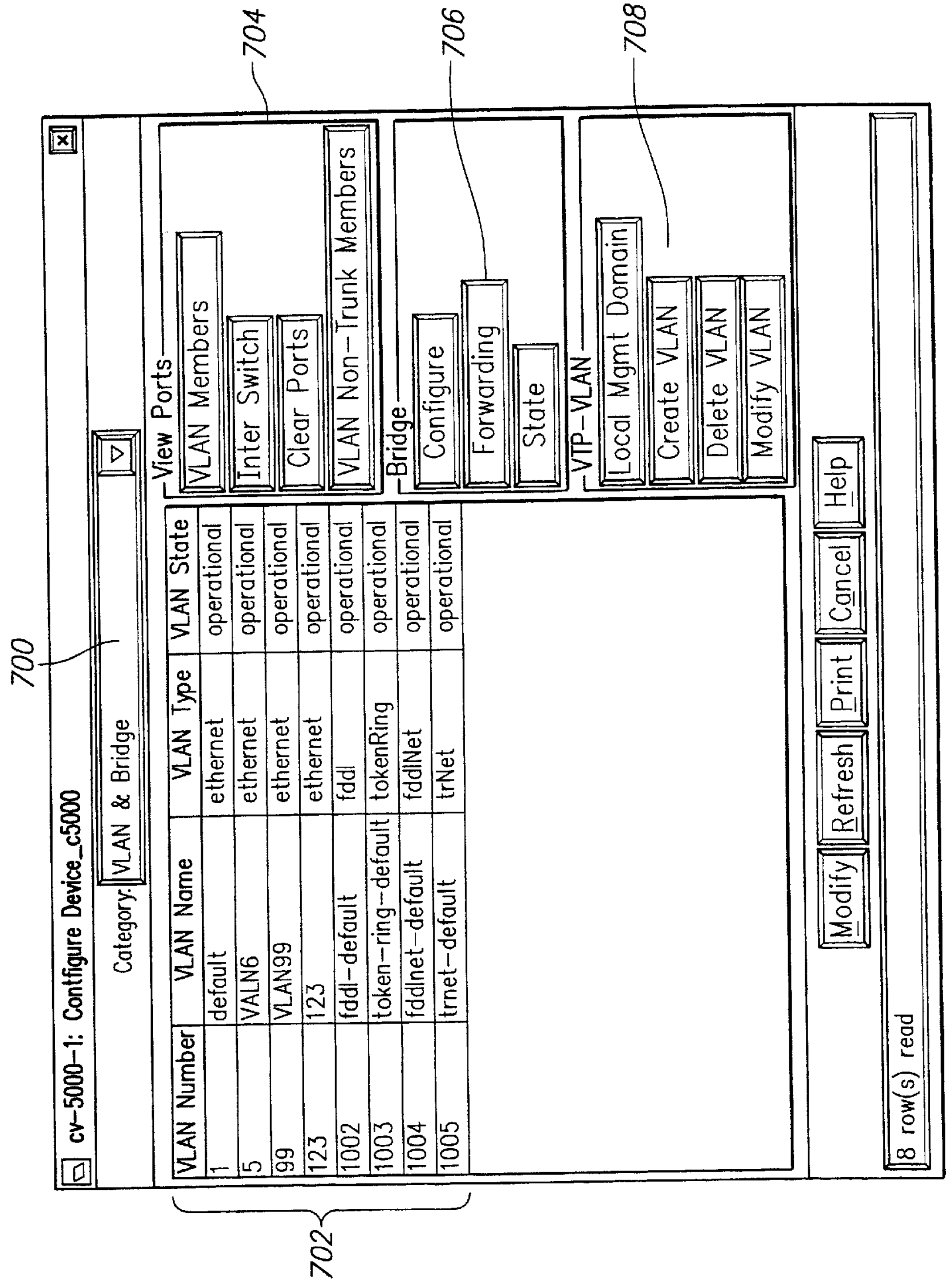
FIG. 7 is a diagram of a user interface display that is generated by the network management system.

FIG. 7 is a diagram of a user interface display that is generated by the network management system under control of the foregoing code. The display includes a category pull-down menu 700 that corresponds to the category description immediately following the dialog type keyword in the above code. The display also includes a table 702 that corresponds to the code listed above in association with the TABLE keyword. The names and locations of groups of buttons 704, 706, 708 are defined by the code given above and set off by the VGroup elements. The names and locations of the buttons in each group are defined by the BUTTON constructs.

Thus, using ADD code, a device description may concisely specify the format of a user interface display to be generated by network management system 40 when the user is working with a particular device. There is no need to modify the network management system 40 to accommodate new devices; the device description is simply updated, re-compiled, and the resulting binary files are provided to the network management system.

Buttons

A button anchors, within a dialog, functions that are implemented in native code and executed when the user presses the button. There is no named button type construct, since the semantics of buttons are that simple. The native code associated with a button can reference any parameter, attribute or natively defined entities, including methods and instance variables, of the enclosing definition, and is allowed to contain object designators.

```
Buttons        = "{" [ Button ("," Button)* ] "}"
Button         = [Label] [Alias] Alias [HelpTag] ButtonAction
ButtonAction   = NativeCode
               | "ok" | "apply" | "refresh" | "create" | "delete" | "print" | "cancel" | "help"
```

The previous section presents an example of using buttons. As an alternative to defining custom code for action to be taken by a button, a device description may specify that standard functions of a dialog are executed each time the user presses the corresponding button. In this way, a standard button may be placed within a dialog. If a standard button does not have a label and if the name of the function of the standard button (ok, apply, refresh, etc.) is not yet used as a label within the corresponding definition, the name of the standard function becomes the label.

Property References

A property type is not specified anonymously within a dialog definition. A property may be used in a dialog only by referencing a named property type. Such a reference can also be made to an implicit property type.

```
PropertyRef=[Label][Alias] Qualident [ConstructionArgs]
```

If an alias is specified within an property reference, it overrides the alias defined for the referenced property type.

Tables

A table construct may be used to define a visual table that appears inside a configuration dialog. The number of columns and the mechanism to populate the table may be defined in a device description. Specifically, two columns shown in one table can obtain data from two different MIB tables, and two columns may have a different number of rows.

The table construct assumes that: Rows are identified by an integer value ranging from 0 to number of rows−1; a list of indexed property types is associated with a table, where each property is responsible for exactly one column. For example, the property defines the title to be shown in the table header, and defines how to cause data to go into the column. As with buttons, a table can be defined only anonymously within a group definition.

```
Table = TABLE [Label] [Alias] "{" PropertyRef("," ElementRef)* "}"
        [ HEIGHT                                                  BracedJavaExpr   ]
        [ FILTER         "(" Identifier ")"                       BracedJavaExpr   ]
        [ CREATE         "(" ElementRef("," ElementRef)* ")"      BracedJavaBlock  ]
        [ DELETE         "(" Identifier ")"                       BracedJavaBlock  ]
        [ ON-SELECTION   BracedJavaBlock                                           ]
        [ ON-DROP        BracedJavaBlock                                           ]
```

If an expression has been specified using a height clause, the table is drawn in the visual dialog with the corresponding number of rows being visible at once. The table construct also may have clauses that define a simple row filter, how to create a new row and how to delete a row. Code defined within the ON-SELECTION clause will be called each time that the user changes the selection of table rows. The example below shows the definition of a simple table to display a portion of a device's ARP MIB table:

```
TABLE{  ipNetToMediaIfIndex,        -- ref to implicit property
        ipNetToMediaNetAddress,     -- ref to implicit property
        ipNetToMediaPhysAddress,    -- ref to implicit property
        ipNetToMediaTypeProp        -- ref to explicit property
    }
ipNetToMediaTypeProp PROPERTY-TYPE
INDEX i
READ { value = 'ipNetToMediaType@[i]'.intVal() - 1; }
WRITE{ 'ipNetToMediaType@[i]' = value + 1; }
::=(other,invalid,dynamic,static)
```

When the network management system needs to populate the table with data, starting with row number 0, each property's read clause is called while the property's index attribute holds the proper row number. The network management system expects the property to result in the implicit attribute value. If a property cannot calculate a value, it generates an exception. For simple properties that have a one-to-one relation between visual row numbers and referenced MIB table row numbers, the exception is thrown by the indexed object designator during the attempt to reference a non-existing element. However, if a device description defines an explicit indexed property, caution should be used in throwing an exception when the end of the column is reached. Otherwise, a definition could lead to a column having a theoretically infinite number of rows that the network management system also tries to populate.

The delete clause may be used to supply programming language statements of functions that are executed when a particular row is deleted. Within this code, the number of the row to be deleted can be accessed using an identifier specified in parentheses after the keyword DELETE:

```
RowDelete=DELETE "(" Identifier ")" BracedJavaBlock
```

The delete clause for the ARP table shown above could look like:

```
DELETE(i){'ipNetToMediaType@[i]'=2;}
```

In this example, ipNetToMediaType denotes the MIB object, not a property. A row filter clause is syntactically similar to a delete clause. An identifier can hold the number of the row to be filtered. However, the filter clause can have only an expression rather than programming language statements. The expression evaluates to a Boolean value, which indicates whether that row is displayed. A filter clause is defined as:

```
RowFilter=FILTER "(" Identifier ")" BracedJavaExpr
```

The expression in the filter clause may access each property of a column by specifying the property label followed by value. An example of the use of filters in a trap receiver table is:

```
TABLE{   "Address"   sysTrapReceiverAddrProp,
         "Community" sysTrapReceiverCommProp }
FILTER(rowNum) {  (rowNum > 1)
                  && !(sysTrapReceiverCommProp.value.startsWith("ken"))
               }
```

A row may be created in a table using the CREATE clause. Syntactically, after the clause keyword, a parenthesized list of indexed property references is specified. After the list, a set of code is provided, comprising programming language statements that define functions that are executed to create the row. Each label defined with the property references are visible only within the code section of the clause.

```
RowCreate=CREATE "(" ElementRef("," ElementRef)*")"
    BracedJavaBlock
```

At run-time, a row may need to be created in response to a user pressing a create button in a configuration dialog. In response, conceptually, a new table is constructed that consists of one column for each specified indexed property and contains no rows. In one embodiment, a special create dialog is created. The create dialog comprises a scalar property for each specified property. The properties are displayed to the user, who is prompted to enter appropriate values.

If the user selects an OK option in the dialog, each of the properties receives its value for the purpose of writing that value to the device. As a result, the conceptual table has exactly one row, but that row is incomplete, because its elements do not have any SNMP index information yet. Consequently, none of the values are actually written to the device.

At this point, the custom code section is executed, to set the SNMP indexes or keys for those properties that actually have to be written to the device. Column object designators offer a set method that accepts a SNMP index in dotted decimal notation represented as a string. Also, a property has a get method that returns its current value in matching dotted decimal notation.

The following example shows use of a create clause for the trap receiver table shown above:

```
CREATE(sysTrapReceiverAddr,sysTrapReceiverComm) -- refs to implicit properties
{
  'sysTrapReceiverComm@()'.setKey(sysTrapReceiverAddr.key());
}
```

This mechanism works because two object designators within a certain context, which point to the same MIB object, share the same data structure. Accordingly, the get-column object designator used by the first property ("sysTrapReceiverAddr") shares the same data structure as the explicit get-column object designator ('sysTrapReceiverCommo@( )'). In contrast, the expression sysTrapReceiverAddr.key( ) accesses the value in dotted decimal notation of the second property sysTrapReceiver-Comm and no object designator.

A second example illustrates an IP route table using the create and delete clause:

```
TABLE{    ipRouteDest,ipRouteNextHop,ipRouteMask,ipRouteProto,ipRouteIfIndex,
          ipRouteMetric1,ipRouteType,ipRouteAge}
CREATE(dest "Destination" ipRouteDest,nextHop "Next Hop" ipRouteNextHop){
  'ipRouteDest@()'.setKey(dest.key());
  'ipRouteNextHop@()'.setKey(dest.key());
}
DELETE(i){ 'ipRouteDest@[i]' = 2; }
```

Monitoring Dialog Types

A monitoring dialog causes the network management system to generate a dialog box that is used to monitor the associated network device. Each monitoring dialog is specified syntactically in a manner that is similar to the configuration dialog.

```
MonitorType = Identifier [ConstructionPars] MONITOR-TYPE
              [ BASED-ON    Qualident       ]
              [ CONTEXT     DeviceContext   ]
              [ ATTRIBUTE   Attributes      ]
              [ NATIVE      NativeCode      ]
              "::=" "{" [ Category ( "," Category )* ] "}"
```

The defined categories may have properties of kind integer, float and bigInt. However, properties can be grouped with the group clause on one group nesting level, and will be displayed together as several graphs in one single chart. The values of property types defined with the option delta-monitoring will be shown as deltas in the graph.

A monitoring dialog clause may define the type of a chart, by specifying in a chart clause a value of strip, dial, or pie. A chart clause is valid at a property reference place as well as with a group clause:

```
Group        = (GROUP|VGROUP|HGROUP) [Chart] [Label] [Alias] Elements
PropertyRef  = [Chart] [Label] [Alias] Qualident [ConstructionArgs]
Chart        = "CHART" ("strip" | "dial" | "pie" | "bar" | "xy")
```

If no chart type is specified, type strip is used as a default. Certain chart types are valid only if they are used with a corresponding element (property or group), as indicated in the following table:

| Chart Type | Element |
|---|---|
| strip, bar | single property or group |
| dial | single property |
| pie | group having at least two properties |
| xy | group having exactly two properties |

An example of a definition of a monitoring dialog is:

```
MonDlg MONITOR-TYPE
::= {   "Category1" {
            Prop1,                      -- will be shown in one strip chart
            CHART dial Prop2,           -- will be shown in one dial chart
            CHART strip Prop3,          -- will be shown in one strip chart
            GROUP CHART pie "title" {
                Prop4, Prop5, Prop6     -- will be alltogether shown in one pie chart
            }
            GROUP CHART xy {
                PropX, PropY            -- will be alltogether shown in one xy chart
            }
        },
        "Category2" {
            . . .
        }
    }
```

Other ADD Elements

Native Types

A native type construct may be used to define classes of a programming language within an ADD module. For example, a native type construct may define container classes for the purpose of propagating multiple values together within the containment tree. Native type constructs also may be used as substitutes for global variables, which are not available in ADD.

```
NativeType = Identifier [ConstructionPars] NATIVE-TYPE
                  [ BASED-ON      (Qualident | JavaName)          ]
                  [ IMPLEMENTS    JavaName ("," JavaName)*        ]
                  [ OPTION        Options                         ]
                  [ INIT          NativeCode                      ]
                  "::=" NativeCode
```

If a native type is defined with the only valid option abstract, the corresponding class generated for that native type will be abstract.

Special rules apply to use of the based-on clause with a native type construct. If the referred name consists only of an identifier i, or a simple qualified identifier M.i, then i must denote another native type defined in the same module or in module M. If the referred base name consists of more then two identifiers, that name is passed unchecked and unchanged into the extends clause of the generated class. The following ADD definitions give an example of such usage:

```
Context NATIVE-TYPE
::=     { String moduleSwVersion;
          int sysUpTime;
          Context(String v, int t){ moduleSwVersion = v; sysUpTime = t; }
}
Dev DEVICE-TYPE
ATTRIBUTE
        context Context =          { new Context('moduleSwVersion.0@+'.stringVal(),
                                     'sysUpTime.0'.intVal())
                                   }
CONFIG Dlg(context)
::=     { Subcomp(context) }
Dlg(context Context) DIALOG-TYPE
::=     { {context.sysUpTime > 4711} { . . . } }
Subcomp(context Context) SLOT-TYPE
NATIVE{
            boolean isValid(String swVersion){ return . . . ; }
        }
::=     { {isValid(context.moduleSwVersion)}?    ThisComp,
          {true}?                                DefaultComp
        }
```

If the native type is defined using construction parameters or having an init clause, then the generated class has corresponding instance variables, and a constructor method with corresponding parameters, and statements in its body to assign the values of the parameters to the instance variables. Using construction parameters, the example above can be abbreviated to:

```
Context(moduleSwVersion String, sysUpTime int) NATIVE-TYPE
::= {}
```

The init clause may define one or more programming language statements that are executed at the time a native type gets instantiated, immediately after the construction parameters have received their values. It can be used to calculate initializations of other native instance variables.

MIB Portion of ADD Compiler

Using the ADD language a device description may refer to a MIB object in an object designator and as a property reference. Each MIB object of a particular network device is defined in a MIB module that is stored in a .my file. The ADD compiler can parse the MIB modules to verify a reference to a particular MIB object.

Further, the network management system needs a run-time representation of MIBs that are used. Accordingly, the ADD compiler translates all MIBs, and their corresponding alias definitions, that are used by a device package into Java-coded MIBs which are stored with a device package. Thus, only the Java-coded MIBs, and none of the MIB modules or MIB definitions in source form are needed by the network management system at run-time.

Generally, the MIB portion of the ADD compiler accepts MIBs defined according to SNMPv1 and SNMPv2 syntax. However, the ADD compiler expects that comments are terminated only by the end of the line, and a MIB file can contain only one MIB module. The end of this description states the complete context-free grammar that may be used to define MIBs.

Alias Definition Files

For display purposes, the network management system may require each MIB object used in a configuration dialog to have an alias in the form of a stored string. For each MIB object, standard MIB syntax provides only a short descriptor, the MIB object's identifier, as well as a relatively long text description in the form of an object's description clause. Accordingly, ADD provides an additional mechanism to define a multi-word, single-line alias.

Each alias for a particular MIB module M is defined in a single text file, the alias definition file with the extension def and with the same name as M. The format of an alias definition file is line-oriented. The character # introduces an end-of-line comment. White space characters in a line have no meaning other than separating items. Such a line is either empty or contains the descriptor of a MIB object followed by the string representing the alias.

Locating MIBS and Alias Definitions

A reference to a particular MIB object comprises the name of the module which provides that object. Thus, there is no place to specify long items, such as a file name including a directory. Consequently, ADD provides a language-external mechanism to locate the actual file. This mechanism uses the environment variable MIBPATH in a manner similar to other well-known path variables such as PATH or CLASSPATH.

In one embodiment, the scope of a search for a particular MIB module M is defined by MIBPATH elements that are separated by the platform-specific path separator characters ":" or ";". If the element is a path name specifying a directory, then that directory is searched for a file M.my and a file M.def. If the element is a path name that specifies a file, then that file is used as a MIB map file to locate the corresponding .my file and def file. The search ends when a .my file is located.

MIB Map Files

In some cases, a file name does not match the module name of a MIB. A MIB map file may be used to associate the file name with the module name. A MIB map file is a text file that defines a mapping of one or more module names to one or more my file names, and optionally to one or more def files. MIB map files are line-oriented; the character # introduces an end-of-line comment. White space characters on a line have no meaning other than separating the items.

A line of a MIB map file may be empty, or may contain the name of a MIB module followed by the full path name of the corresponding .my file. Optionally, this is followed by the full path name of a corresponding .def file:

```
MibMapLine =  Modulename MyFilename [DefFilename]
Modulename =  Identifier
```

-continued

| | |
|---|---|
| MyFilename = . . . | ; platform-specific file name |
| DefFilename = . . . | ; platform-specific file name |

Development Environment

Object-oriented Programming

The preferred embodiment is implemented in an object-oriented programming language, and many of the preferred structures have been developed in the context of object-oriented programming systems. It is assumed that the reader is familiar with fundamental principles of object-oriented programming in general and the Java® language in particular, including the nature and use of classes, subclasses, methods, messages, inheritance, and polymorphism, etc. Such principles are not described in detail in this document to avoid obscuring the invention. A general reference is Arnold & Gosling, "The Java Programming Language" (Addison-Wesley 1997). A standard reference work on object-oriented programming is B. Meyer, "Object-oriented Software Construction."

In the preferred embodiment, the mechanisms are implemented in the form of an object class library or dynamically linked library (DLL).

Elements of Development Environment

In one embodiment, a device description development environment comprises a make system, a Java compiler and a package linker.

The make system handles all invocations of the ADD compiler. In one embodiment, a file called Makefile is created and stored in a device package directory. The Makefile lists the names of all ADD source files in the initialization of SOURCES:

```
.SUFFIXES:
include ../../make.common
include ../make.common
# names of ADD source files list here:
SOURCES = C5K.add
TARGET:→ Descriptor.class
Descriptor.class:→ Descriptor.java
→  $(JAVAC) -classpath $(CLASS_LIB_DIR) Descriptor.java
Descriptor.java:→  $(SOURCES)
→  $(ADDC) -m
clean:
→  -rm -rf $(CLEAN) $(SOURCES:.add=)
```

The command-line program make then may be called to process the Makefile. In response, the make program carries out steps that:

1. Invoke the ADD compiler. The ADD compiler reads all ADD modules. As output, the ADD compiler generates a subdirectory M for each ADD module M. For each definition of M, the ADD compiler generates one source file in a standard programming language, e.g., Java. The ADD compiler also creates and stores an import source file.

2. Invoke a compiler of the standard programming language on the import source file. As a result, all other generated classes are imported. The compiler of the standard programming language may then compile all source files to byte code or executable object code. In the preferred embodiment, a Java compiler is invoked on the import file M/AllImportjava, which imports all other generated Java classes, in order to compile all Java source files to Java byte code.

3. Invoke the ADD Package Linker. The ADD Package Linker compiles all imported MIB source files into language-coded MIBs, and stores the MIBs into the subdirectory mibs. The ADD Package Linker also generates a package descriptor file.

4. Invoke the standard programming language compiler on the package descriptor file. In response, the language-coded MIBs are compiled.

Standard MIBS

The development environment may comprise one or more Standard MIBs in the form of a source file and an alias definition file for each MIB. If a device package needs its own MIBs, the source files are stored in the device package directory.

Device Package Information

A device package directory may also include a device package information file that stores attributes of the device package. The format of the file is line-oriented:

| | | |
|---|---|---|
| PkgInfoLine = "alias" | "=" | StringSpec |
| \| "version" | "=" | StringSpec |
| \| "copyright" | "=" | StringSpec |
| \| "linkage" | "=" | "static" |

Comments may be introduced by a pound character (#) and extend to the end of the corresponding line. If a device package P has static attribute linkage, and another device package uses P, then the ADD compiler will embed code generated for each used module from P into the device package including all images and coded MIBs of P. An example for pkginfo may contain:

| | |
|---|---|
| alias | = "Device Family XYZ" |
| version | = "1.0" |
| copyright | = "(c) 1999 Cisco Systems, Inc." |
| linkage | = static |

Other Elements of Development Environment

In the preferred embodiment, the development environment requires the Java Development Kit (JDK) Release 1.1, which is commercially available from Sun Microsystems, Inc.

The development environment consists also of a fully functional network management system operating in stand-alone mode and which allows the developer to test the developed device package.

For the network management system to be operational, certain mechanisms or software modules must be accessible in the development environment. The mechanisms include discovery; a network management system user interface and chassis display; a function library that implements SNMP functions, and a Real Time Poller. In the preferred embodiment, the foregoing mechanisms include the Java® Foundation Classes from Sun Microsystems, Inc., the JGL container/collection package from ObjectSpace. One of ordinary skill in the art will recognize that integration of these elements requires various shell scripts, installation and configuration, and other setup work.

In the preferred embodiment, configuration parameters may be stored in a properties file. For example, the properties file identifies the current machine that is serving as a server for the network management system.

Hardware Overview

Figure 8:
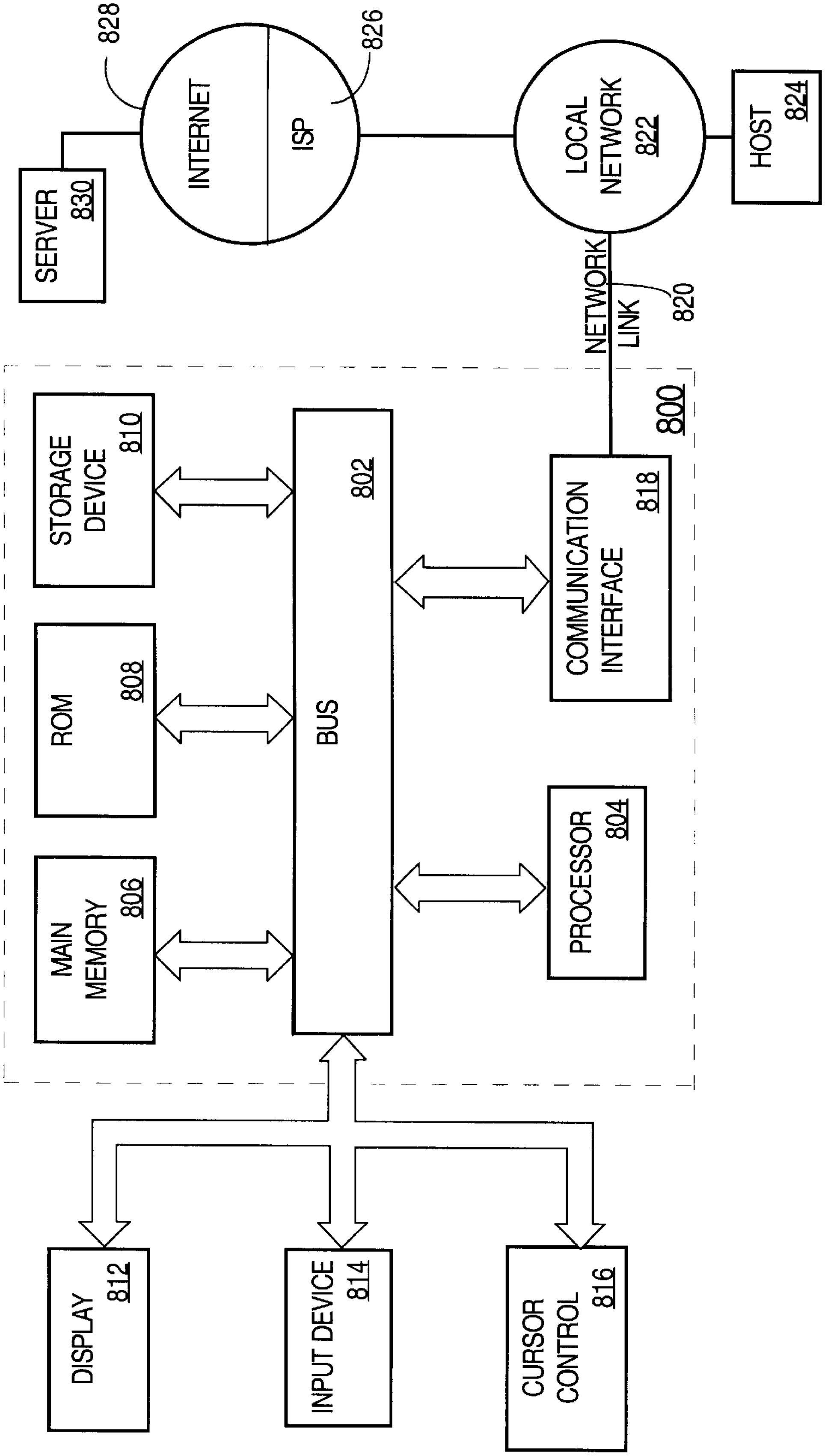
FIG. 8 is a block diagram of a computer system on which aspects of the invention may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Functions of embodiments of the invention are provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector can receive the data carried in the infrared signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. One such downloaded application provides the functions of the preferred embodiment as described herein.

The received code may be executed by processor 804 as it is received, and/or stored in storage device 810, or other non-volatile storage for later execution. In this manner, computer system 800 may obtain application code in the form of a carrier wave.

Extensions, Alternatives, Advantages

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Using the system, methods and mechanisms described above, a developer may specify manageable aspects of devices within a special language, designed exactly for that purpose. The language allows a document to express abstract structures of a device description explicitly. Accordingly, several benefits and advantages are provided. For example, increased safety is provided. The ADD compiler can check various conditions regarding the integrity of a device description, going beyond the checks that are performed by a compiler for a traditional programming language.

The system also makes the network management system more independent. The interface between a CDD and the network management system can be improved later, without the need to modify the ADDs. Only the code generator of the ADD compiler has to be changed. After a recompilation of the ADDs, the CDDs fit into the changed engine interface.

The system also improves language independence. The language for the CDD is not restricted to Java. By developing a different code generator for the ADD compiler, any other language can be used without modifying existing ADD modules.

The system improves development flexibility. Using command-line options, the ADD compiler can generate different versions of CDDs during the development process. For instance, one version can have debugging code embedded in it, which emits various debugging data about the status of a device representation and its interaction with the physical device. For example, an SNMP trace log can be provided without imposing overhead on the device representation that is delivered to users.

The system helps reduce redundancies between device packages and fosters code reuse. The ADD model enables a device description to reuse previously developed components. For example, a port of a given type may be modeled only once and then used multiple times.

The system also reduces redundancies between different applications. The ADD model can be extended, so it can serve as a common device model. ADDs may become the main repository for obtaining device specific information, either by another ADD compiler (simply with a different back-end) at compile-time/build-time of an application or through an ADD server responding with a concrete device representation at run-time to requests coming from other applications.

Of course, with ADD the developer has to learn the new ADD syntax, but by using a CDD directly the developer had to learn new conventions (e.g. which callbacks used for what purpose), too. To minimize the learning curve for ADD, its syntax is an extension of ASN.1, with which the developers are already familiar (shown by their ability to read MIB files).

COMPLETE ADD GRAMMAR

Set forth below is an example of a context-free grammar for ADD modules that may be accepted by an implementation of an LL(k) parser.

```
Module            = JavaIdentifier DEFINITIONS ": : =" BEGIN
                        [ IMPORTS (Import)+ ";"]
                        ( Definition )*
                        END
Import            = ImportName ("," ImportName)* FROM ModuleRef
                    |   [JavaIdentifier": : ="] ModuleRef
                    |   "{" JavaIdentifier ("." JavaIdentifier)* ["." "*"] "}"
ImportName        = JavaIdentifier
ModuleRef         = [JavaIdentifier "."] JavaIdentifier
                    |   <UCNAME>
Definition        = JavaIdentifier
                        ( ParametrizedType
                        | DeviceType
                        | VisualType
                        )
ParametrizedType  = [ConstructionPars]
                        ( [EvaluationPars] (ComponentType | SlotType )
                        | ( MenuType | DialogType | MonitorType | GroupType | PropertyType | NativeType )
                        )
DeviceType        = DEVICE-TYPE
                        OidSpec
                        [ CONTEXT     DeviceContext ]
                        [ ATTRIBUTE   Attributes    ]
                        [ TOOLBAR     DefRef        ]
                        [ MENU        DefRef        ]
                        [ CONFIG      DefRef        ]
                        [ MONITOR     DefRef        ]
                        [ NATIVE      NativeCode    ]
                        [ ON-DISPLAY                BracedJavaBlock  ]
                        ( View )+
                        ": : =" Subcomponents
ComponentType     = COMPONENT-TYPE ["(" JavaIdentifier")"]
                        [ BASED-ON    Qualident     ]
                        [ IMAGE       StringSpec    ]
                        [ OPTION      Options       ]
                        [ CONTEXT     DeviceContext ]
                        [ ATTRIBUTE   Attributes    ]
                        [ MENU        DefRef        ]
                        [ CONFIG      DefRef        ]
                        [ MONITOR     DefRef        ]
                        [ POLL        BracedJavaBlock  ]
                        [ NATIVE      NativeCode    ]
                        [ ON-DISPLAY                BracedJavaBlock  ]
                        [ ": : = " (Subcomponents | VisualRef)
SlotType          = SLOT-TYPE ["(" JavaIdentifier")"]
                        [ BASED-ON    Qualident     ]
                        [ IMAGE       StringSpec    ]
                        [ OPTION      Options       ]
                        [ CONTEXT     DeviceContext ]
                        [ ATTRIBUTE   Attributes    ]
                        [ CONFIG      DefRef        ]
```

-continued

```
                [ NATIVE        NativeCode      ]
                [ ": : =" CondSubcomponents
VariantType     = Identifier [ConstructionPars] [EvaluationPars] VARIANT-TYPE
                [ ON-DISPLAY                    BracedJavaBlock        ]
                [ ": : =" VariantSubcomponents
VisualType      = VISUAL-TYPE
                [ BASED-ON      Qualident       ]
                [ DEFAULT       VisualDefaultItem      ]
                [ ": : =" "{" VisualItem ("," VisualItem)* [","] "}"
MenuType        = MENU-TYPE
                [ BASED-ON      Qualident       ]
                [ CONTEXT       DeviceContext   ]
                [ ATTRIBUTE     Attributes      ]
                [ NATIVE        NativeCode      ]
                [ ": : =" MenuItems
DialogType      = DIALOG-TYPE
                [ BASED-ON      Qualident       ]
                [ TITLE         StringSpec      ]
                [ OPTION        Options         ]
                [ CONTEXT       DeviceContext   ]
                [ ATTRIBUTE     Attributes      ]
                [ NATIVE        NativeCode      ]
                ": : =" "{" [ Category ("," Category)* [","] ] "}"
MonitorType     = MONITOR-TYPE
                [ BASED-ON      Qualident       ]
                [ CONTEXT       DeviceContext   ]
                [ ATTRIBUTE     Attributes      ]
                [ NATIVE        NativeCode      ]
                [ ": : =" "{" [ Category ("," Category)* [","] ]"}"
GroupType       = GROUP-TYPE
                [ BASED-ON      Qualident       ]
                [ OPTION        Options         ]
                [ CONTEXT       DeviceContext   ]
                [ ATTRIBUTE     Attributes      ]
                [ NATIVE        NativeCode      ]
                [ READ          BracedJavaBlock        ]
                [ WRITE         BracedJavaBlock        ]
                [ ACTION        BracedJavaBlock        ]
                [ ON-DROP       BracedJavaBlock        ]
                [ ON-DISPLAY                    BracedJavaBlock        ]
                [ BUTTONS       Buttons         ]
                ": : =" Elements
PropertyType    = PROPERTY-TYPE
                [ BASED-ON      Qualident       ]
                [ DESCR         StringSpec      ]
                [ ALIAS         StringSpec      ]
                [ OPTION        Options         ]
                [ CONTEXT       DeviceContext   ]
                [ ATTRIBUTE     Attributes      ]
                [ NATIVE        NativeCode      ]
                [ INDEX         Identifier      ]
                [ UNITS         String          ]
                [ MIN           BracedJavaExpr
                  [WARNING      BracedJavaExpr         ]
                  [ALERT        BracedJavaExpr         ]
                   MAX          BracedJavaExpr
                ]
                [ READ          BracedJavaBlock        ]
                [ WRITE         BracedJavaBlock        ]
                [ ACTION        BracedJavaBlock        ]
                [ ON-DROP       BracedJavaBlock        ]
                [ ": : =" ] JavaIdentifier ] ["(" EnumItem ("," EnumItem)* ["," ")" ]
NativeType      = NATIVE-TYPE
                [ BASED-ON      (Qualident | JavaName)         ]
                [ IMPLEMENTS                    JavaName ("," JavaName)*        ]
                [ INIT          NativeCode             ]
                [ ": : =" NativeCode
OidSpec         = OID Oid ("," Oid)* [Condition]
Oid             = Qualident ("." Unsigned)*
                | Unsigned ("." Unsigned)*
                | "{" Qualident (Unsigned)* "}"
View            = VIEW Label [Alias [HelpTag] ] [Condition]
                IMAGE StringSpec
                [ "{" ( "*" | SubcompRef ("," SubcompRef)* [","] ") "}" ]
                [ OPTION Options ]
SubcompRef      = Label ["*"]
StringSpec      = String | BracedJavaExpr
Options         = Option ("," Option)*
Option          = ["!"]( "selectable"|"dragable"
```

-continued

```
                              | "no-compound"|"compound-only"
                              | "auto-refresh"
                              | "abstract"
                              | "delta-monitoring"
Subcomponents            = "{" [ SubcomponentOrIterator ("," SubcomponentOrIterator)* [","] ] "}"
CondSubcomponents        = "{" [ Condition Subcomponent ("," Condition Subcomponent)* [","] ]
"}"
SubcomponentOrIterator             =           Subcomponent | SubcomponentIterator
Subcomponent             = ( Position CompoundQualident
                           | CompoundIdentifier
                              [ CompoundIdentifier ["." CompoundIdentifier]
                              | "." CompoundIdentifier
                              | Position CompoundQualident
                              ]
                           )
                           [ConstructionArgs] [EvaluationArgs]
VariantSubcomponents          =         "{" [ VariantSubcomponent ("," VariantSubcomponent)*
[","] ] "}"
VariantSubcomponent           =         (           CompoundIdentifier
                              [CompoundIdentifier ["." CompoundIdentifier]
                              | "." CompoundIdentifier
                              ]
                           )
                           [ConstructionArgs] [EvaluationArgs]
SubcomponentIterator          =         "["
                           IteratorHeader
                           SubcomponentOrIterator ("," SubcomponentOrIterator)* [","]
                           "]"
IteratorHeader           = IteratorHead ("," IteratorHead)* ":"
IteratorHead             = JavaIdentifier "=" "{" IteratorElement ("," IteratorElement)* "}"
IteratorElement          = Signed [". ." Signed] | JavaIdentifier
MenuItems                = "{" [MenuItem ("," MenuItem)* [","] ] "}"
MenuItem                 = SEPARATOR
                         |  [Condition] [DEFAULT]       [Label] ( Alias [IMAGE StringSpec] | IMAGE StringSpec )
BracedJavaBlock
                         |  [Condition] MENU [Label] ( Alias [IMAGE StringSpec] | IMAGE StringSpec ) MenuItems
                         |  [Condition] MENU [Label] ( Alias [IMAGE StringSpec] IMAGE StringSpec ) DefRef
Category                 = SEPARATOR
                         |  [Condition] [Label] Alias [HelpTag] ElementRoot
ElementRoot              = CompoundQualident [ConstructionArgs]
                         |  CUSTOM BracedJavaExpr
                         |  ACTION NativeCode
                         |  [BUTTONS Buttons] Elements
Elements                 = "{" [ Element ("," Element)* ["," ] ]"}"
Element                  = [Condition] ElementRef
                         |  [Condition] BUTTON Button [ON-DROP BracedJavaBlock ]
                         |  [Condition] TABLE [Label] [Alias] "{" ElementRef ("," ElementRef)* [","] "}"
                            [ HEIGHT        BracedJavaExpr          ]
                            [ FILTER "("Label ")"       BracedJavaExpr          ]
                            [ CREATE "("ElementRef ("," ElementRef)* [","] ")"        BracedJavaBlock    ]
                            [ DELETE "("Label ")"       BracedJavaBlock         ]
                            [ ON-SELECTION              BracedJavaBlock         ]
                            [ ON-DROP       BracedJavaBlock         ]
                         |  [Condition] (GROUP|VGROUP|HGROUP) [Chart] [CompoundIdentifier] [Alias]
                            [ON-DROP BracedJavaBlock ]
                            Elements
                         |  [Condition] CUSTOM BracedJavaExpr
                         |  "[" IteratorHeader Element ("," Element)* [","] "]"
ElementRef               = [ Chart ]
                            ( Alias CompoundQualident
                            | CompoundIdentifier
                               [ "." CompoundIdentifier | [Alias] CompoundQualident ]
                            )
                            [ConstructionArgs]
Buttons                  = "{" [ Button ("," Button)* [","] ]"}"
Button                   = [CompoundIdentifier] [Alias] [HelpTag] ButtonAction
ButtonAction             = NativeCode
                         | "ok" | "apply" | "refresh" | "create" | "delete" | "print" | "cancel" | "help"
Chart                    = CHART ("strip" | "dial" | "pie")
EnumItem                 = <IDENT> | <CHRSTR>
VisualRef                = Qualident "{" JavaExpr "}" | CUSTOM "(" JavaExpr ")"
VisualDefaultItem        = Signed | VisualValue | JavaIdentifier
VisualItem               = (JavaIdentifier ["(" Signed ")"] | Signed ) VisualValue
VisualValue              = String | NativeCode
                         |  ( JavaIdentifier "." JavaIdentifier ["." JavaIdentifier]
                         |  <UCNAME> "." JavaIdentifier "." JavaIdentifier
                            )
Condition                = "{" JavaExpr "}" "?"
ConstructionPars         = "(" Parameters")"
```

-continued

```
EvaluationPars          = "{" Parameters "}"
Parameters              = Parameter ("," Parameter)*
Parameter               = JavaIdentifier Type
ConstructionArgs        = "(" Arguments ")"
EvaluationArgs          = "{" Arguments "}"
Arguments               = Argument ("," Argument)*
Argument                = JavaExpr
DeviceContext           = BracedJavaExpr
Attributes              = Attribute ("," Attribute)*
Attribute               = JavaIdentifier Type "="
                              ( BracedJavaExpr
                              | CATCH BracedJavaExpr BracedJavaExpr
                              )
DefRef                  = Qualident ["(" Arguments ")"]
Type                    = (OCTET STRING
                              | OBJECT IDENTIFIER
                              | JavaIdentifier ("." JavaIdentifier)*
                              )
                              ("[" "]")*
Position                = AT "(" JavaExpr "," JavaExpr ")"
CompoundQualident
                              = <COMPOUNDIDENT>
                              |      <IDENT> [ "." (<IDENT>|<COMPOUNDIDENT>) ]
                              |      <UCNAME> "." (<IDENT>|<COMPOUNDEDIDENT>)
Qualident               = <IDENT> ["." <IDENT>]
                        |     <UCNAME> "." <IDENT>
Label                   = <IDENT>
CompoundIdentifier      = <COMPOUNDIDENT> | <IDENT>
JavaIdentifier          = <IDENT> | <JAVA_IDENTIFIER<
HelpTag                 = <CHRSTR>
Alias                   = <CHRSTR>
String                  = <CHRSTR>
Signed                  = "-" Unsigned | Unsigned
Unsigned                = <DECNUMBER>
                        |     <HEXNUMBER>
                        |     <OCTNUMBER>
                        |     <HEXSTRING>
                        |     <BINSTRING>
BracedJavaExpr          = "{" JavaExpr "}"
BracedJavaBlock         = JavaBlock
NativeCode              = "{" Native "}"
ObjectDesignator        = "'" ObjDsg "'" (ObjDsgSuffix)*
ObjDsg                  = ( ObjDsgVar
                                   (<DSG_IDENT> | ObjDsgVar)*
                                   ("." <DSG_NUMBER>)*
                              |    <DSG_IDENT>
                                   [             "."
                                                 (<DSG_IDENT> | <DSG_NUMBER>)
                                                 ("." <DSG_NUMBER>)*
                                   |             ObjDsgVar
                                                 (<DSG_IDENT> | ObjDsgVar)*
                                                 ("." <DSG_NUMBER>)*
                                   ]
                              |    <DSG_NUMBER> ("." <DSG_NUMBER>)*
                              )
                              ("," JavaExpr)*
                              ["@" ObjDsgIndex]
ObjDsgVar               = "${" <DSG_IDENT>"}"
ObjDsgIndex             = "+"
                        |     [ObjDsgWalkAugment] "(" [JavaExpr] ")"
                        |     [ObjDsgWalkAugment] " " [JavaExpr] "]"
ObjDsgWalkAugment             = "{" ( "," [StopExpr] | StartExpr ]"," StopExpr]) "}"
StartExpr               = JavaExpr
StopExpr                = JavaExpr
ObjDsgSuffix            = "." JavaIdentifier | JavaArguments
JavaExpr                = JavaConditionalExpr [JavaAssignmentOperator JavaExpr]
JavaConditionalExpr           = JavaConditionalOrExpr          ["?" JavaExpr ":" JavaConditionalExpr]
JavaConditionalOrExpr              =              JavaConditionalAndExpr         ("| |"
JavaConditionalAndExpr)*
JavaConditionalAndExpr        =                   JavaInclusiveOrExpr ("&&" JavaInclusiveOrExpr)*
JavaInclusiveOrExpr           = JavaExclusiveOrExpr            ("|" JavaExclusiveOrExpr)*
JavaExclusiveOrExpr           = JavaAndExpr            ("^" JavaAndExpr)*
JavaAndExpr             = JavaEqualityExpr             ("&" JavaEqualityExpr)*
JavaEqualityExpr              = JavaInstanceOfOrInExpr         (("= ="|"! =") JavaInstanceOfOrInExpr)*
JavaInstanceOfOrInExpr                    =        JavaRelationalExpr       [ "instanceof" JavaType |
"IN" JavaSet ]
JavaRelationalExpr            = JavaShiftExpr (("<"|">"|<="|">=") JavaShiftExpr)*
JavaShiftExpr                 = JavaAdditiveExpr       (("<<"|">>"|">>>") JavaAdditiveExpr)*
JavaAdditiveExpr        = JavaMultiplicativeExpr               (("+"|"-") JavaMultiplicativeExpr)*
JavaMultiplicativeExpr             =              JavaUnaryExpr(("*"|"/"|"%") JavaUnaryExpr)*
```

-continued

```
JavaUnaryExpr           = ("="|"–") JavaUnaryExpr
                        |    JavaPreIncrementExpr
                        |    JavaPreDecrementExpr
                        |    JavaUnaryExprNotPlusMinus
JavaPreIncrementExpr            =              "+ +" JavaPrimaryExpr
JavaPreDecrementExpr                           =                  "– –" JavaPrimaryExpr
JavaUnaryExprNotPlusMinus
                        = ("~"|"!") JavaUnaryExpr
                        |    JavaCastExpr
                        |    JavaPostfixExpr
JavaPostfixExpr         = JavaPrimaryExpr ["+ +"|"– –"]
JavaCastExpr            = "(" JavaType ")" JavaUnaryExpr
                        |    "(" JavaType ")" JavaUnaryExprNotPlusMinus
JavaPrimaryExpr         = ObjectDesignator
                        |    JavaPrimaryPrefix (JavaPrimarySuffix)*
JavaPrimaryPrefix       = JavaLiteral
                        |    "this"
                        |    "super" "." JavaIdentifier
                        |    "(" JavaExpr ")"
                        |    JavaAllocationExpr
                        |    JavaName
JavaPrimarySuffix       = "." (ObjectDesignator | "this")
                        |    "[" JavaExpr "]"
                        |    "." JavaIdentifier
                        |    JavaArguments
JavaLiteral             = <JAVA_INTEGER_LITERAL>
                        |    <JAVA_FLOATING_POINT_LITERAL>
                        |    <JAVA_CHARACTER_LITERAL>
                        |    <JAVA_STRING_LITERAL>
                        |    JavaBooleanLiteral
                        |    JavaNullLiteral
JavaBooleanLiteral      = "true" "false"
JavaNullLiteral         = "null"
JavaArguments           = "(" [JavaArgumentList] ")"
JavaArgumentList        = JavaExpr (","JavaExpr)*
JavaType                = (JavaPrimitiveType | JavaName) ("[" "]")*
JavaPrimitiveType       = "Boolean" | "char" | "byte" | "short" | "int" | "long" | "float" |
"double"
JavaResultType          = "void" | JavaType
JavaName                = JavaIdentifier ("." JavaIdentifier)*
JavaSet                 = "{" JavaSetElement ("," JavaSetElement)* [","] "}"
JavaSetElement          = JavaExpr [". ." JavaExpr]
JavaAssignmentOperator
                        = "=" | "*=" | "/=" | "%=" | "+=" | "–=" | "<<=" | ">>=" | ">>=" | "&=" | "^=" |
"|="
JavaAllocationExpr      = "new" JavaPrimitiveType JavaArrayDimsAndInits
                        |    "new" JavaName (JavaArrayDimsAndInits | JavaArguments)
JavaArrayDimsAndInits =                  ("[" JavaExpr "]")+ ("[" "]")*
                        |    ("[" "]")= JavaArrayInitializer
JavaVariableDeclarator =                 JavaVariableDeclaratorId ["=" JavaVariableInitializer]
JavaVariableDeclaratorId                 =              JavaIdentifier ("[" "] ")*
JavaVariableInitializer = JavaArrayInitializer | JavaExpr
JavaArrayInitializer    = "{" [ JavaVariableInitializer ("," JavaVariableInitializer)* ] [","] "}"
JavaFormalParameter =                    ["final"] JavaType JavaVariableDeclaratorId
JavaStatement           = JavaLabeledStatement
                        |    JavaBlock
                        |    ";"
                        |    JavaStatementExpr ";"
                        |    JavaSwitchStatement
                        |    JavaIfStatement
                        |    JavaWhileStatement
                        |    JavaDoStatement
                        |    JavaForStatement
                        |    JavaBreakStatement
                        |    JavaContinueStatement
                        |    JavaReturnStatement
                        |    JavaThrowStatement
                        |    JavaSynchronizedStatement
                        |    JavaTryStatement
JavaLabeledStatement =                   JavaIdentifier ":" JavaStatement
JavaBlock               = "{" (JavaBlockStatement)* "}"
JavaBlockStatement           = JavaLocalVariableDeclaration ";"
                        |    JavaStatement
JavaLocalVariableDeclaration
                        = ["final"] JavaType JavaVariableDeclarator (","
JavaVariableDeclarator)*
JavaStatementExpr       = JavaPreIncrementExpr
                        |    JavaPreDecrementExpr
                        |    JavaPrimaryExpr ["+ +" | "– –" | JavaAssignmentOperator JavaExpr ]
```

-continued

```
JavaSwitchStatement        = “switch” “(” JavaExpr “)” “{”
                           (JavaSwitchLabel (JavaBlockStatement)* )*
                           “}”
JavaSwitchLabel            = “case” JavaExpr “:” | “default” “:”
JavaIfStatement            = “if” “(” JavaExpr “)” JavaStatement [“else” JavaStatement]
JavaWhileStatement               = “while” “(” JavaExpr “)” JavaStatement
JavaDoStatement            = “do” JavaStatement “while” “(” JavaExpr “)” “;”
JavaForStatement           = “for” “(” [JavaForInit] “;” [JavaExpr] “;”[JavaStatementExprList] “)”
                                 JavaStatement
JavaForInit                = JavaLocalVariableDeclaration | JavaStatementExprList
JavaStatementExprList =                        JavaStatementExpr (“,” JavaStatementExpr)*
JavaBreakStatement               = “break” [JavaIdentifier] “;”
JavaContinueStatement                          =          “continue” [JavaIdentifier] “;”
JavaReturnStatement              = “return” [JavaExpr]“;”
JavaThrowStatement               = “throw” JavaExpr “;”
JavaSynchronizedStatement
                           = “synchronized” “(” JavaExpr “)” JavaBlock
JavaTryStatement           = “try” JavaBlock
                                 ( “catch” “(” JavaFormalParameter “)” JavaBlock )*
                                 [ “finally” JavaBlock ]
Token Definitions
(Defined through regular expressions)
<COMMENT>                  = “– –” .. “\n” | “(*” (.. | <COMMENT>) “*)”
<IDENT>                    = <ident>
<COMPOUNDIDENT> =                       (<ident> | “$(” <ident> “}” )+
<UCNAME>                   = [“A”–“Z”] <nameTail>
<LCNAME>                   = [“a”–“z”] <nameTail>
<ident>                    = <letter> (<letgit> )*
<nameTail>                 = ( <letgit> | “–” <letgit> )*
<letter>                   = [“A”–“Z”,“a”–“z”,“_”]
<letgit>                   = [“A”–“Z”,“a”–“z”,“_”,“0”–“9”]
<digit>                    = [“0”–“9”]
<CHRSTR>                   = “\"” ( ~[“\"”] | “\\” “\"” )* “\"”
<DECNUMBER>                = “0” | [“1”–“9”] ( <digit> )*
<HEXNUMBER>                = “0” [“x”,“X”] ([“0”–“9”,“a”–“f”,“A”–“F”])+
<OCTNUMBER>                = “0” ([“0”–“7”])*
<HEXSTRING>                = “'” ([“0”–“9”,“a”–“f”,“A”–“F”])= “'” [“h”,“H”]
<BINSTRING>                = “'” ([“0”–“1”])= “'” [“b”,“B”]
<DSG_IDENT>                = <DSG_letter> ( <DSG_letgit> )*
<DSG_NUMBER>               = “0” | [“1”–“9”] ( <digit> )*
<DSG_letter>               = [“A”–“Z”,“a”–“z”]
<DSG_letgit>               = [“A”–“Z”,“a”–“z”,“0”–“9”]
<DSG_digit>                = [“0”–“9”]
<JAVA_INTEGER_LITERAL>
                           = <JAVA_DECIMAL_LITERAL> ([“1”,“L”])?
                           |     <JAVA_HEX_LITERAL> ([“1”,“L”])?
                           |     <JAVA_OCTAL_LITERAL> ([“1”,“L”])?
<JAVA_DECIMAL_LITERAL>
                           = [“1”–“9”] (<digit>)*
<JAVA_HEX_LITERAL>                      =            “0” [“x”,“X”] ([“0”–“9”,“a”–“f”,“A”–“F”])+
<JAVA_OCTAL_LITERAL>
                           = “0” ([“0”–“7”])*
<JAVA_FLOATING_POINT_LITERAL>
                           = (<digit>)+ “.” (<digit>)*          (          <JAVA_EXPONENT>)? (   [“f”,“F”,“d”,“
                           |             “.”    (<digit>)+      (          <JAVA_EXPONENT>)? (   [“f”,“F”,“d”,“
                           |                 (<digit>)+         <JAVA_EXPONENT>       (    [“f”,“F”,“d”,“D”])?
                           |                 (<digit>)+ (       <JAVA_EXPONENT>)?          [“f”,“F”,“d”,“D”]
<JAVA_EXPONENT>            = [“e”,“E”] ([“+”,“–”])? ([“0”–“9”])+
<JAVA_CHARACTER_LITERAL>
                           = “'”
                                 (  (~[“'”,“\\”,“\n”,“\r”])
                                 |  ( “\\”
                                       ( [“n”,“t”,“b”,“r”,“f”,“\\”,“'”,“\”]
                                       | [“0”–“7”] ( [“0”–“7”] )?
                                       | [“0”–“3”] [“0”–“7”] [“0”–“7”]
                                       )
                                    )
                                 )
                                 “'”
<JAVA_STRING_LITERAL>
                           = “\”
                                 (  (~[“\"”,“\\”,“\n”,“\r”])
                                 |  ( “\\”
                                       ( [“n”,“t”,“b”,“r”,“f”,“\\”,“'”,“\"”]
                                       | [“0”–“7”] ( [“0”–“7”] )?
                                       | [“0”–“3”] [“0”–“7”] [“0”–“7”]
                                       )
                                    )
                                 )*
```

-continued

```
                    "\""
<JAVA_IDENTIFIER> =                  <JAVA_LETTER> (<JAVA_LETTER>|<JAVA_DIGIT>)*
<JAVA_LETTER>     =   [ "\u0024",
                        "\u0041"-"\u005a",
                        "\u005f",
                        "\u0061"-"\u007a"
                        "\u00c0"-"\u00d6",
                        "\u00d8"-"\u00f6",
                        "\u00f8"-"\u00ff"
                      ]
<JAVA_DIGIT>      =   [ "\u0030"-"\u0039"]
```

COMPLETE MIB GRAMMAR

Set forth below is an example of a context-free grammar for MIB files that may be accepted by an embodiment of an LL(k) parser.

```
File                 = (Module )+
Module               = <UCNAME> DEFINITIONS "::=" BEGIN
                         [ IMPORTS (Import)+";" ]
                         ( Definition )*
                         END
Import               = ImportName ("," ImportName)* FROM ModuleIdentifier
ImportName           = Identifier
                     |   ( OBJECT-TYPE
                         | OBJECT-IDENTITY
                         | TRAP-TYPE
                         | MODULE-IDENTITY
                         | TEXTUAL - CONVENTION
                         | OBJECT-GROUP
                         | MODULE - COMPLIANCE
                         | NOTIFICATION-TYPE
                         | NOTIFICATION-GROUP
                         | AGENT-CAPABILITIES
                         )
Definition           = <LCNAME>
                         ( ModuleIdentity
                         | OidAssignment
                         | ObjectIdentity
                         | OBJECT-TYPE SYNTAX (Table | RowOrScalar )
                         | Trap
                         | Notification
                         | ObjectGroup
                         | NotificationGroup
                         | ModuleCompliance
                         | AgentCapabilities
                         )
                     |   <UCNAME>
                         ": : ="
                         ( TypeAssignment
                         | TextualConvention
                         | Sequence
                         )
ModuleIdentity       = MODULE-IDENTITY
                           LAST-UPDATED     |String
                           ORGANIZATION     |String
                           CONTACT-INFO     |String
                           DESCRIPTION      |String
                         ( REVISION         |String
                           DESCRIPTION      |String
                         )*
                         ": : =" OidValue
OidAssignment        = OBJECT IDENTIFIER ": : =" OidValue
ObjectIdentity       = OBJECT-IDENTITY
                           STATUS       Status
                           DESCRIPTION              |String
                         [ REFERENCE |String ]
                         ": : =" OidValue
TypeAssignment       = Type
TextualConvention    = TEXTUAL-CONVENTION
                         [ DISPLAY-HINT             |String
                           STATUS       Status
                           DESCRIPTION              |String
```

-continued

```
                        [ REFERENCE     |String ]
                          SYNTAX        Type
Table                   = SEQUENCE OF Identifier
                          (ACCESS|MAX-ACCESS) Access
                          STATUS        Status
                        [ DESCRIPTION              |String ]
                        [ REFERENCE     |String ]
                        ": : =" OidValue
RowOrScalar             = Type
                        [ UNITS         Units ]
                          (ACCESS|MAX-ACCESS) Access
                          STATUS        Status
                        [ DESCRIPTION                   |String ]
                        [ REFERENCE     |String ]
                        ( IndexOrAugments
                          ": : =" "{" Identifier <NUMBER> "}"
                        | [ DEFVAL "{" DefVal "}" ]
                          ": : =" OidValue
                        )
IndexOrAugments         = INDEX                 "{" IndexItem ("," IndexItem)* "}"
                        |   AUGMENTS            "{"Qualident "}"
IndexItem               = IMPLIED Qualident
                        |   <LCNAME>
                        |   <UCNAME> ["." <LCNAME>]
                        |   OCTET STRING
                        |   OBJECT IDENTIFIER
Sequence                = SEQUENCE "{" SeqMember ("," SeqMember)* "}"
SeqMember               = <LCNAME> Type
Trap                    = TRAP-TYPE
                          ENTERPRISE (Qualident | "{" Identifier "}" )
                        [ VARIABLES "{" Qualident ("," Qualident)* "}" ]
                        [ DESCRIPTION |String
                        [ REFERENCE |String ]
                        ": : =" Number
Notification            = NOTIFICATION-TYPE
                        [ OBJECTS       "{" Qualident ("," Qualident)* "}" ]
                          STATUS        Status
                          DESCRIPTION        |String
                        [ REFERENCE     |String ]
                        ": : =" OidValue
ObjectGroup             = OBJECT-GROUP
                          OBJECTS       "{" <LCNAME> ("," <LCNAME>)* "}"
                          STATUS        Status
                          DESCRIPTION        |String
                        [ REFERENCE     |String ]
                        ": : =" OidValue
NotificationGroup       = NOTIFICATION-GROUP
                          NOTIFICATIONS                 "{" <LCNAME> (","<LCNAME>)* "}"
                          STATUS        Status
                          DESCRIPTION        |String
                        [ REFERENCE     |String]
                        ": : =" OidValue
ModuleCompliance        = MODULE-COMPLIANCE
                        [ STATUS        Status ]
                        [ DESCRIPTION                   |String
                        [ REFERENCE     |String
                        ( McModule )*
                        ": : =" OidValue
McModule                = MODULE [ModuleIdentifier]
                        [   MANDATORY-GROUPS "{" <LCNAME> ("," <LCNAME>)* "}" ]
                        (   GROUP       <LCNAME>
                            DESCRIPTION            |String
                        |  OBJECT       <LCNAME>
                          [ SYNTAX      Type]
                          [ WRITE-SYNTAX           Type ]
                          [ MIN-ACCESS             Access ]
                            DESCRIPTION            |String
                        )*
AgentCapabilities       = AGENT-CAPABILITIES
                          PRODUCT-RELEASE               |String
                          STATUS        Status
                          DESCRIPTION                   |String
                        [ REFERENCE     |String]
                        ( AcModule )*
                        ": : =" OidValue
AcModule                = SUPPORTS ModuleIdentifier
                          INCLUDES "}" <LCNAME> ("," <LCNAME>)* "}" ]
                        ( AcVariation )*
```

-continued

```
AcVariation          = VARIATION <LCNAME>
                         [ SYNTAX           Type ]
                         [ WRITE-SYNTAX                    Type ]
                         [ ACCESS           Access ]
                         [ CREATION-REQUIRES               “{” <LCNAME>(“,” <LCNAME>)* “}” ]
                         [ DEFVAL           “{” DefVal “}” ]
                           DESCRIPTION                     |String
Type                 = BITS [ “{” BitItem (“,” BitItem)* “}” ]
                     | Identifier
                         [ “(” ( SIZE “(” Ranges “)” | Ranges ) “)”
                         | Enumerations
                         ]
                     | OCTET STRING [“(” SIZE “(” Ranges “) ” “)” ]
                     | OBJECT IDENTIFIER
Ranges               = RangeItem (“|” RangeItem)*
RangeItem            = SignedVal [“. .” (MAX|SignedVal) ]
Enumerations         = “{” EnumItem (“,” EnumItem)* “}”
EnumItem             = <LCNAME> “(” SignedVal “)”
BitItem              = <LCNAME> “(” Number “)”
SignedVal            = Number
                     | “-” Number
                     | BinNumber
                     | HexNumber
DefVal               = String
                     | BinString
                     | HexString
                     | Number
                     | “-” Number
                     | Qualident
                     | DefOidVal
DefOidVal            = “{”
                         [ Number OidCompVals
                         [ <UCNAME> “.” <LCNAME> OidCompVals
                         [ <LCNAME>
                           [ (“,” <LCNAME>)+
                           | [“(” Number “)”] OidCompVals
                           ]
                         ]
                         “}”
OidValue             = ImmediateOidValue | Qualident
ImmediateOidValue    = “{”
                         ( Number OidCompVals
                         | <UCNAME> “.” <LCNAME> OidCompVals
                         | <LCNAME> “(”Number “)”] OidCompVals
                         )
                         “}”
OidCompVals          = ( OidCompVal )+
OidCompVal           = Number | <LCNAME>“(” Number “)”
ModuleIdentifier     = <UCNAME> [ImmediateOidValue]
Qualident            = <UCNAME> “.”] <LCNAME>
Identifier           = <UCNAME> | <LCNAME>
Number               = <NUMBER>
BinNumber            = <BINSTR>
HexNumber            = <HEXSTR>
|String              = <CHRSTR>
String               = <CHRSTR>
Binstring            = <BINSTR>
HexString            = <HEXSTR>
Units                = <CHRSTR>
Access               = <LCNAME>
Status               = <LCNAME>
Token Definitions
(Defined through regular expressions)
<COMMENT>            = “- -” .. “\n”
<UCNAME>             = [“A”–“Z”]<nameTail>
<LCNAME>             = [“a”–“z”]<nameTail>
<nameTail>           = (<letgit> | “-” <letgit> )*
<letgit>             = [“A”–“Z”,“a”–“z”,“0”–“9”]
<NUMBER>             = ( <digit> )+
<digit>              = [“0”–“9”]
<CHRSTR>             = “\"” ( ~[“\"”] | “\\” “\"” )* “\"”
<BINSTR>             = “'” ([“0”,“1”])* “'” [“B”,“b”]
<HEXSTR>             = “'” ([“0”–“9”,“A”–“f”,“a”–“f”])* “'” [“H”,“h”]
```

CONTAINMENT HIERARCHY EXAMPLE

This is an example of a containment hierarchy as defined in an ADD.

```
SomeDev DEVICE-TYPE
: : = VIEW front { Ps, CardA(1), CardB(2) }
Ps COMPONENT-TYPE
: : = { Led{'chassisPs1Status.0'.intVal () } }
CardA (slotNo INTEGER) COMPONENT-TYPE
: : = { Led{'moduleStatus,slotNo'.intVal () },
        [i=1. .3: PortX(slotNo,i)]
      }
CardB (slotNo INTEGER) COMPONENT-TYPE
: : = { Led{'moduleStatus,slotNo'.intVal () },
        PortY(slotNo,1), PortY(slotNo,2)
      }
Led{value INTEGER} COMPQNENT-TYPE
: : = Led{value}
PortX(slotNo INTEGER, portNo INTEGER) COMPONENT-TYPE
: : = Port{ 'portOperStatus,slotNo,portNo'. intVal ()
  +'someOtherStatus,slotNo,portNo'.intVal ()
        }
PortY(slotNo INTEGER, portNo INTEGER) COMPONENT-TYPE
: : = Port{ portOperStatus,slotNo,portNo'.intVal () }
Led : : = INTEGER{ . . . }
Port : : = INTEGER{ . . . }
```

What is claimed is:

1. A method of creating and storing information that represents a logical description of a network device for use in a network management system, the method comprising the steps of:

creating and storing a tree that represents a logical hierarchy of the components of the network device, based on a textual description of physical components of the network device, wherein the description includes a logical expression;

creating and storing a first node of the tree that represents a logical slot of the network device that may be configured with one of a plurality of sub-components;

creating and storing a result value by evaluating the logical expression using a value that is obtained from the network device in real time;

selecting one of the plurality of sub-components based on the result value;

creating and storing a second node as a child node of the first node, wherein the second node represents the selected one of the plurality of sub-components.

2. A method as recited in claim 1, wherein creating and storing a tree further comprising the steps of:

creating and storing a tree that logically represents the components of the network device, wherein the tree comprises a third node representing the device type and one or more component nodes that represent hardware or software elements of the network device;

creating and storing a the first node as a child node of the third node.

3. A method as recited in claim 1, further comprising the steps of creating and storing the textual description in the form of one or more stored device descriptions, each device description comprising a definition of a device type node and one or more component type nodes.

4. A method as recited in claim 1, further comprising the steps of creating and storing the textual description in the form of one or more stored device descriptions, each device description comprising a definition of a device type node, one or more component type nodes, and one or more slot type nodes, wherein each of the slot type nodes includes a logical expression that can be used to select a sub-component node that is contained within that slot type node.

5. A method as recited in claim 1, wherein creating and storing a result value includes creating and storing a result value by evaluating the logical expression using a value for a variable in the expression that is obtained from the network device.

6. A method as recited in claim 1, wherein creating and storing a result value includes creating and storing a result value by evaluating the logical expression using a value for a variable in the expression that is obtained from the network device in real time at a time at which the tree is created and stored.

7. A method as recited in claim 1, wherein creating and storing a result value includes creating and storing a result value by evaluating the logical expression using a value for a variable in the expression that is obtained from the network device in real time at run time of the network management system.

8. A method as recited in claim 1, wherein creating and storing a result value includes creating and storing a result value by evaluating the logical expression using a value for a variable in the expression that is obtained from the network device in real time upon initialization of the network management system.

9. A method as recited in claim 1, wherein creating and storing a result value includes creating and storing a result value by evaluating the logical expression using a value for a variable in the expression that is obtained from the network device in real time using a dynamic device discovery operation of the network management system.

10. A method as recited in claim 1, further comprising the steps of:

creating and storing the textual description, including a description of the first node according to the grammar:

```
SlotType            = Identifier [ConstructionPars] [EvaluationPars] SLOT-TYPE
                      ["(" Identifier ")"]
                      [ BASED-ON    Qualident      ]
                      [ IMAGE       StringSpec     ]
                      [ OPTION      Options        ]
                      [ CONTEXT     DeviceContext  ]
                      [ ATTRIBUTE   Attributes     ]
                      [ NATIVE      Declarations   ]
                      "::=" CondSubcomponents
CondSubcomponents   = "{" CondSubcomp ("," CondSubcomp)* "}"
CondSubcomp         = Condition Subcomponent.
```

11. A computer-readable medium carrying one or more sequences of instructions for creating and storing information that represents a logical description of a network device for use in a network management system, wherein execution of the one or more sequences of instructions by one or more processors causes the one or more processors to perform the steps of:

creating and storing a tree that represents a logical hierarchy of the components of the network device, based on a textual description of physical components of the network device, wherein the description includes a logical expression;

creating and storing a first node of the tree that represents a logical slot of the network device that may be configured with one of a plurality of sub-components;

creating and storing a result value by evaluating the logical expression using a value that is obtained from the network device in real time;

selecting one of the plurality of sub-components based on the result value;

creating and storing a second node as a child node of the first node, wherein the second node represents the selected one of the plurality of sub-components.

12. A computer-readable medium as recited in claim 11, wherein execution of the one or more sequences of instructions causes the one or more processors to execute the further steps of:

creating and storing a tree that represents a logical hierarchy of the components of the network device, based on a textual description of physical components of the network device, wherein the description includes a logical expression;

creating and storing a first node of the tree that represents a logical slot of the network device that may be configured with one of a plurality of sub-components;

creating and storing a result value by evaluating the logical expression using a value that is obtained from the network device in real time;

selecting one of the plurality of sub-components based on the result value;

creating and storing a second node as a child node of the first node, wherein the second node represents the selected one of the plurality of sub-components.

13. A computer-readable medium as recited in claim 11, wherein creating and storing a tree further comprising the steps of:

creating and storing a tree that logically represents the components of the network device, wherein the tree comprises a third node representing the device type and one or more component nodes that represent hardware or software elements of the network device;

creating and storing a the first node as a child node of the third node.

14. A computer-readable medium as recited in claim 11, further comprising the steps of creating and storing the textual description in the form of one or more stored device descriptions, each device description comprising a definition of a device type node and one or more component type nodes.

15. A computer-readable medium as recited in claim 11, further comprising the steps of creating and storing the textual description in the form of one or more stored device descriptions, each device description comprising a definition of a device type node, one or more component type nodes, and one or more slot type nodes, wherein each of the slot type nodes includes a logical expression that can be used to select a sub-component node that is contained within that slot type node.

16. A computer-readable medium as recited in claim 11, wherein creating and storing a result value includes creating and storing a result value by evaluating the logical expression using a value for a variable in the expression that is obtained from the network device.

17. A computer-readable medium as recited in claim 11, wherein creating and storing a result value includes creating and storing a result value by evaluating the logical expression using a value for a variable in the expression that is obtained from the network device in real time at a time at which the tree is created and stored.

18. A computer-readable medium as recited in claim 11, wherein creating and storing a result value includes creating and storing a result value by evaluating the logical expression using a value for a variable in the expression that is obtained from the network device in real time at run time of the network management system.

19. A computer-readable medium as recited in claim 11, wherein creating and storing a result value includes creating and storing a result value by evaluating the logical expression using a value for a variable in the expression that is obtained from the network device in real time upon initialization of the network management system.

20. A computer-readable medium as recited in claim 11, wherein creating and storing a result value includes creating and storing a result value by evaluating the logical expression using a value for a variable in the expression that is obtained from the network device in real time using a dynamic device discovery operation of the network management system.

21. A computer-readable medium as recited in claim 11, further comprising the steps of:

creating and storing the textual description, including a description of the first node according to the grammar:

```
SlotType            = Identifier [ConstructionPars] [EvaluationPars] SLOT-TYPE
                      ["(" Identifier ")"]
                      [ BASED-ON   Qualident     ]
                      [ IMAGE      StringSpec    ]
                      [ OPTION     Options       ]
                      [ CONTEXT    DeviceContext ]
                      [ ATTRIBUTE  Attributes    ]
                      [ NATIVE     Declarations  ]
                      ::=" CondSubcomponents
CondSubcomponents   = "{" CondSubcomp ("," CondSubcomp)* "}"
CondSubcomp         = Condition Subcomponent.
```

22. An apparatus for creating and storing information that represents a logical description of a network device for use in a network management system, comprising:

means for creating and storing a tree that represents a logical hierarchy of the components of the network device, based on a textual description of physical components of the network device, wherein the description includes a logical expression;

means for creating and storing a first node of the tree that represents a logical slot of the network device that may be configured with one of a plurality of sub-components;

means for creating and storing a result value by evaluating the logical expression using a value that is obtained from the network device in real time;

means for selecting one of the plurality of sub-components based on the result value;

means for creating and storing a second node as a child node of the first node, wherein the second node represents the selected one of the plurality of sub-components.

23. An apparatus as recited in claim 22, wherein the means for creating and storing a tree further comprises:

means for creating and storing a tree that logically represents the components of the network device, wherein the tree comprises a third node representing the device type and one or more component nodes that represent hardware or software elements of the network device;

means for creating and storing a the first node as a child node of the third node.

24. An apparatus as recited in claim 22, further comprising means for creating and storing the textual description in the form of one or more stored device descriptions, each device description comprising a definition of a device type node and one or more component type nodes.

25. An apparatus as recited in claim 22, further comprising means for creating and storing the textual description in the form of one or more stored device descriptions, each device description comprising a definition of a device type node, one or more component type nodes, and one or more slot type nodes, wherein each of the slot type nodes includes a logical expression that can be used to select a sub-component node that is contained within that slot type node.

26. An apparatus as recited in claim 22, wherein the means for creating and storing a result value includes means for creating and storing a result value by evaluating the logical expression using a value for a variable in the expression that is obtained from the network device.

27. An apparatus as recited in claim 22, wherein the means for creating and storing a result value includes the means for creating and storing a result value by evaluating the logical expression using a value for a variable in the expression that is obtained from the network device in real time at a time at which the tree is created and stored.

28. An apparatus as recited in claim 22, wherein the means for creating and storing a result value includes means for creating and storing a result value by evaluating the logical expression using a value for a variable in the expression that is obtained from the network device in real time at run time of the network management system.

29. An apparatus as recited in claim 22, wherein the means for creating and storing a result value includes means for creating and storing a result value by evaluating the logical expression using a value for a variable in the expression that is obtained from the network device in real time upon initialization of the network management system.

30. An apparatus as recited in claim 22, wherein the means for creating and storing a result value includes means for creating and storing a result value by evaluating the logical expression using a value for a variable in the expression that is obtained from the network device in real time using a dynamic device discovery operation of the network management system.

31. An apparatus as recited in claim 22, further comprising:

means for creating and storing the textual description, including a description of the first node according to the grammar:

| | |
|---|---|
| SlotType | = Identifier [ConstructionPars] [EvaluationPars] SLOT-TYPE |
| | ["(" Identifier ")"] |
| | [ BASED-ON Qualident ] |
| | [ IMAGE StringSpec ] |
| | [ OPTION Options ] |
| | [ CONTEXT DeviceContext ] |
| | [ ATTRIBUTE Attributes ] |
| | [ NATIVE Declarations ] |
| | "::=" CondSubcomponents |
| CondSubcomponents | = "{" CondSubcomp ("," CondSubcomp)* "}" |
| CondSubcomp | = Condition Subcomponent. |

32. An apparatus for creating and storing information that represents a logical description of a network device for use in a network management system, comprising:

a processor;

a network interface configured to be communicatively coupled to a network to receive packet flows therefrom; and a computer-readable medium carrying one or more sequences of instructions for creating and storing information that represents a logical description of a network device for use in a network management system, wherein execution of the one or more sequences of instructions by one or more processors causes the one or more processors to perform the steps of:

creating and storing a tree that represents a logical hierarchy of the components of the network device, based on a textual description of physical components of the network device, wherein the description includes a logical expression;

creating and storing a first node of the tree that represents a logical slot of the network device that may be configured with one of a plurality of sub-components;

creating and storing a result value by evaluating the logical expression using a value that is obtained from the network device in real time;

selecting one of the plurality of sub-components based on the result value;

creating and storing a second node as a child node of the first node, wherein the second node represents the selected one of the plurality of sub-components.

33. An apparatus as recited in claim 32, wherein the sequences of instructions for creating and storing a tree further comprise sequences of instructions for:

creating and storing a tree that logically represents the components of the network device, wherein the tree comprises a third node representing the device type and one or more component nodes that represent hardware or software elements of the network device;

creating and storing a the first node as a child node of the third node.

34. An apparatus as recited in claim 32, further comprising sequences of instructions for creating and storing the textual description in the form of one or more stored device descriptions, each device description comprising a definition of a device type node and one or more component type nodes.

35. An apparatus as recited in claim 32, further comprising sequences of instructions for creating and storing the textual description in the form of one or more stored device descriptions, each device description comprising a definition of a device type node, one or more component type nodes, and one or more slot type nodes, wherein each of the slot type nodes includes a logical expression that can be used to select a sub-component node that is contained within that slot type node.

36. An apparatus as recited in claim 32, wherein the sequences of instructions for creating and storing a result value include sequences of instructions for creating and storing a result value by evaluating the logical expression using a value for a variable in the expression that is obtained from the network device.

37. An apparatus as recited in claim 32, wherein the sequences of instructions for creating and storing a result value include sequences of instructions for the creating and storing a result value by evaluating the logical expression using a value for a variable in the expression that is obtained from the network device in real time at a time at which the tree is created and stored.

38. An apparatus as recited in claim 32, wherein the sequences of instructions for creating and storing a result value include sequences of instructions for creating and storing a result value by evaluating the logical expression using a value for a variable in the expression that is obtained from the network device in real time at run time of the network management system.

39. An apparatus as recited in claim 32, wherein the sequences of instructions for creating and storing a result value include sequences of instructions for creating and storing a result value by evaluating the logical expression using a value for a variable in the expression that is obtained from the network device in real time upon initialization of the network management system.

40. An apparatus as recited in claim 32, wherein the sequences of instructions for creating and storing a result value include sequences of instructions for creating and storing a result value by evaluating the logical expression using a value for a variable in the expression that is obtained from the network device in real time using a dynamic device discovery operation of the network management system.

41. An apparatus as recited in claim 32, further comprising sequences of instructions for creating and storing the textual description, including a description of the first node according to the grammar:

| | | | |
|---|---|---|---|
| SlotType | = Identifier [ConstructionPars] [EvaluationPars] SLOT-TYPE | | |
| | ["(" Identifier ")"] | | |
| | [ BASED-ON | Qualident | ] |
| | [ IMAGE | StringSpec | ] |
| | [ OPTION | Options | ] |
| | [ CONTEXT | DeviceContext | ] |
| | [ ATTRIBUTE | Attributes | ] |
| | [ NATIVE | Declarations | ] |
| | "::=" CondSubcomponents | | |
| CondSubcomponents | = "{" CondSubcomp ("," CondSubcomp)* "}" | | |
| CondSubcomp | = Condition Subcomponent. | | |

* * * * *